United States Patent
Mann et al.

(10) Patent No.: US 7,587,345 B2
(45) Date of Patent: Sep. 8, 2009

(54) RESIDENTIAL DELIVERY SYSTEM AND METHOD

(75) Inventors: Justin Mann, Golden Valley, MN (US); Chris Servais, New Hope, MN (US)

(73) Assignee: SimonDelivers.com, Inc., Golden Valley, MN (US)

(*) Notice: Subject to any disclaimer, the term of this patent is extended or adjusted under 35 U.S.C. 154(b) by 1072 days.

(21) Appl. No.: 10/378,166

(22) Filed: Mar. 3, 2003

(65) Prior Publication Data

US 2004/0176962 A1    Sep. 9, 2004

(51) Int. Cl.
*G06Q 10/00* (2006.01)
*G06Q 30/00* (2006.01)

(52) U.S. Cl. .................. 705/28; 705/1; 705/26
(58) Field of Classification Search ............ 705/26, 705/28
See application file for complete search history.

(56) References Cited

U.S. PATENT DOCUMENTS

| | | | | |
|---|---|---|---|---|
| 1,921,968 | A * | 8/1933 | Endacott | 40/383 |
| 5,897,629 | A * | 4/1999 | Shinagawa et al. | 706/13 |
| 6,795,823 | B1 * | 9/2004 | Aklepi et al. | 707/10 |
| 6,879,962 | B1 * | 4/2005 | Smith et al. | 705/22 |
| 7,079,913 | B2 * | 7/2006 | Kato et al. | 700/115 |
| 7,139,721 | B2 * | 11/2006 | Borders et al. | 705/9 |
| 7,177,825 | B1 * | 2/2007 | Borders et al. | 705/26 |
| 7,437,305 | B1 * | 10/2008 | Kantarjiev et al. | 705/8 |
| 2001/0047237 | A1 * | 11/2001 | Nakagawa et al. | 701/202 |
| 2001/0047285 | A1 * | 11/2001 | Borders et al. | 705/8 |
| 2002/0010661 | A1 * | 1/2002 | Waddington et al. | 705/28 |
| 2003/0149585 | A1 * | 8/2003 | Foster et al. | 705/1 |
| 2004/0068443 | A1 * | 4/2004 | Hopson et al. | 705/26 |
| 2004/0202154 | A1 * | 10/2004 | Aklepi et al. | 370/352 |
| 2005/0114194 | A1 * | 5/2005 | Pandit | 705/9 |
| 2007/0016463 | A1 * | 1/2007 | Borders et al. | 705/8 |
| 2007/0062851 | A1 * | 3/2007 | Schulz et al. | 209/584 |
| 2007/0088628 | A1 * | 4/2007 | Hopson et al. | 705/27 |

FOREIGN PATENT DOCUMENTS

| | | | |
|---|---|---|---|
| JP | 2001034881 A | * | 2/2001 |
| JP | 2002302257 A | * | 10/2002 |
| WO | WO 00/68856 | | 11/2000 |
| WO | WO 00/68859 | | 11/2000 |

OTHER PUBLICATIONS

ShopLink Selects Descartes' e-Business Home Delivery Solution to Optimize Service and Delivery for Its Online Grocery and Household Service, Aug. 6, 1999, Business Wire.*

(Continued)

*Primary Examiner*—Matthew S Gart
*Assistant Examiner*—Scott A Zare
(74) *Attorney, Agent, or Firm*—Bridget M. Hayden; Dorsey & Whitney LLP

(57) ABSTRACT

A method and system for delivery establishes a delivery subsector for a distribution facility, adjusts at delivery area within the delivery subsector, plans a flexible delivery route in the delivery area, and completes deliveries. Deliveries having delivery locations closest to the distribution facility are not assigned to the flexible delivery route such that additional delivery resources are required only in areas in close proximity with the distribution facility.

13 Claims, 24 Drawing Sheets

OTHER PUBLICATIONS

Daganzo, Carlos F., The Distance Traveled to Visit N Point with a Maximum of C Stops per Vehicle: An Analytic Model and an Application, Nov. 1984, Transportation Science, vol. 18, No. 4, p. 331-350.*

Davis, Tim, The Shortest distance between two points . . . , Aug. 1990, Beverage World, vol. 109, No. 1471, p. 35.*

Su, Chwen-Tzeng, Dynamic Vehicle Control and Scheduling of a Multi-Depot Physical Distribution System, 1999, Integrated Manufacturing Systems, vol. 10, No. 1, p. 56-65.*

Savelsbergh, M. W. P. and Goetschalckx, M., A Comparison of the Efficiency of Fixed Versus Variable Vehicle Routes, 1995, Journal of Business Logistics, vol. 16, No. 1, p. 163-187.*

* cited by examiner

Simon Delivers

Check Delivery Times | Learn More | Contact us

Greetings from SimonDelivers.com

We deliver top-quality produce, meat and seafood, bakery items and more to 53,000 households in the seven-county Metro area. Plus, we have a Wine and Spirits Shop.

customers, log in:
name:
password:

Welcome, new customers!

Shop right now!
Let us simplify your life - starting now! Delivery is free; there's no membership fee; and no risk! You can start shopping or browse the Web Store now.
(Get Started)

Check delivery times in your neighborhood
Enter your Zip Code:
55305
(Delivery Times)

Pick of the week
Milk Twin-Packs
$4.88

Here's why we're a smarter way to shop

✓ 100% Satisfaction Guarantee
✓ Free Delivery
✓ Freshest Selection
✓ We save you time
✓ Learn more

*Fig. 5A*

□ SimonDelivers.com - Delivery Timeslots - Microsoft Internet Explorer

We're in your neighborhood!

We're a route-based grocery-delivery service - sort of like the milkman. To see when our Neighborhood Service Representatives are in your neighborhood, please enter your address and click "Continue."

Street Number: [12000]  Street Name: [Cedar Lake Rd]  Street Direction: [ ]

City: [Hopkins - Hennepin - MN]  Zip Code  55305

[ ]

"You save me at least four hours a month." - Greg F., Burnsville
"Thanks for great service." - Laurie W., Burnsville
Close the window.

SimonDelivers.com respects the privacy of our customers.

Fig. 5B

SimonDelivers.com    Delivery Timeslots - Microsoft Internet Explorer

Here are the days and times we're in you neighborhood!

You can start shopping, and if you need help, feel free to call a customer service representative (763) 971-4900

| Delivery slot: | order due by: | Wine and Spirits delivery available? |
|---|---|---|
| ○ Wednesday, between 9 am and 11 am | Tuesday at 5 p.m. | See Rules |
| ○ Thursday, between 1 p.m. and 3 p.m. | Wednesday at 11 p.m. | See Rules |
| ○ Monday, between 2 p.m and 4 p.m. | Sunday at 11 p.m. | See Rules |
| ○ Tuesday, between 6 p.m. and 8 p.m. | Monday at 11 p.m. | See Rules |
| ○ Friday, between 7 p.m. and 9 p.pm. | Thursday at 11 p.m. | See Rules |

Click here to see complete rules for delivery of Wine & Spirits from SimonDelivers.com "Within an hour of signing on as a new customer, I had navigated through the Web Store, familiarized myself with the products and placed my first order." Cheri B., Lakeville
Close this window SimonDelivers.com respects the privacy of our customers.

*Fig. 6*

ALTERNATE DELIVERY DAY

Your next delivery date is Thursday, November 14, between 9 a.m. and 11 a.m. (Order must be placed by Wenesday, November 13 at 5 p.m.)

We offer delivery flexibility!
Our grocery delivery service provides you with a standing delivery day and time, which is great for setting up a routine and staying on a schedule. But we also offer delivery flexibility for when you need a different delivery day or maybe two deliveries in a week See below for the times we'll be in your neighborhood. (Note: Everyone gets 10 free Alternate Delivery days a year. Get the details)

You've made 0 alternate delivery changes this year. You can make 10 more free changes this year.

Please choose a one-time alternate delivery time available in your neighborhood.

| Delivery slot: | Order due by: | Wine & Spirits delivery available? |
|---|---|---|
| ○ Friday, November 8, between 1 p.m. and 3 p.m. | Thursday, November 7 at 11 p.m. | Yes |
| ○ Monday, November 11, between 8 a.m. and 10 a.m. | Sunday, November 10 at 5 p.m. | Yes |
| ○ Tuesday, November 12, between 2 p.m. and 4 P.m. | Monday, November 11 at 11 p.m. | Yes |
| ○ Friday, November 15, between 1 p.m. and 3 p.m. | Thursday, November 14 at 11 p.m. | Yes |
| ○ Monday, November 18, between 8 a.m. and 10 a.m. | Sunday, November 17 at 5 p.m. | Yes |
| ○ Tuesday, November 19, between 2 p.m. and 4 p.m. | Monday, November 18 at 11 p.m. | Yes |

*Fig. 9*

RESIDENTIAL DELIVERY SYSTEM AND METHOD

TECHNICAL FIELD

The present invention relates generally to a delivery system. More specifically, the present invention relates to a process for delivering products to residences.

BACKGROUND OF THE INVENTION

Delivery of products and other items to customers at a residence, business, or other geographic location is known in the art. The typical delivery process is an "on demand" system. As depicted in FIG. 1, an "on demand"-based delivery system typically involves a customer placing an order for an item or items (block 2), the system locating the ordered item(s) (block 4). Often, the item(s) are delivered to the customer on a "first in, first out" basis (block 6). "First in, first out" means that each order is delivered in a chronological order based on when the order was received, with an earlier order having priority over a later order. Thus, in an "on demand" model, the customer can theoretically select products at any desired time and receive them immediately, or "on demand."

However, for certain products that are delivered to residences, the "on demand" system lacks efficiency and consequently results in higher costs to the retailer in delivery delays and in a perception that the retailer is unreliable.

As such, there is a need for a system and method for a provider of products to economically and efficiently deliver requested products to the customer's residence in a timely manner. There is need in the art for a delivery system and method designed to provide cost efficient delivery. There is a further need for a delivery system and process that provides the security, continuity, and overall customer satisfaction that results from each delivery person routinely delivering to the same customers.

BRIEF SUMMARY OF THE INVENTION

According to one embodiment, the present invention is a method of delivery. The method of delivery includes establishing at least one delivery subsector adjacent to a distribution facility, planning at least one flexible delivery route in the at least one delivery subsector, and completing deliveries along the at least one flexible delivery route whereby any initially unassigned deliveries are at delivery locations closest to the distribution facility.

In a further embodiment, the present invention is a method of delivery including establishing at least two delivery sectors adjacent to a distribution facility. In this embodiment, each delivery sector has at least two delivery subsectors and the at least two delivery subsectors have at least two flexible delivery routes. The method also includes planning a first route of the at least two flexible delivery routes and then successively planning each additional route of the at least two flexible delivery routes wherein each additional route is planned based on each previously planned route. In addition, the method includes completing deliveries along each of the at least two flexible delivery routes in one of the at least two delivery subsectors concurrently whereby any initially unassigned deliveries are at delivery locations closest to the distribution facility.

The present invention according to another embodiment is a method of delivery including distributing products from a distribution hub to a plurality of distribution facilities and establishing at least two delivery sectors adjacent to each of the plurality of distribution facilities. In this embodiment, each delivery sector has at least two delivery subsectors and each of the at least two delivery subsectors has at least two flexible delivery routes. The method also includes planning a first route and then successively planning each additional route wherein each additional route is planned based on each previously planned route, and in each of the at least two delivery sectors, completing deliveries along each of the at least two flexible delivery routes in one of the at least two delivery subsectors concurrently whereby any initially unassigned deliveries are at delivery locations closest to the distribution facility.

Another aspect of the present invention is a method of ordering and delivering items. The method includes allowing a customer to choose a selected recurring delivery slot from a selection of recurring delivery slots, allowing the customer to order at least one desired item, and delivering from a distribution facility the at least one desired item to the customer during the selected recurring delivery slot.

According to another embodiment, the present invention is a method of ordering and delivering items that includes creating at least two delivery subsectors adjacent to a distribution facility, and providing at least two delivery slots for each of the at least two subsectors. Further, the invention includes allowing each of a plurality of customers in each of the at least two delivery subsectors to select a preferred delivery slot from the at least two delivery slots, and further allowing the plurality of customers to place a plurality of orders for desired items. Additionally, the invention includes planning at least two flexible delivery routes in each of the at least two delivery subsectors based on the plurality of orders, and concurrently delivering, during the selected delivery slot of each of the plurality of customers, the desired items to the plurality of customers along the at least two flexible delivery routes.

The present invention, according to one aspect, includes a delivery system having a distribution hub and a plurality of distribution facilities configured to receive items from the distribution hub. The invention also includes at least two subsectors adjacent to each of the plurality of distribution facilities, and at least two flexible delivery routes within each of the at least two subsectors, wherein the at least two flexible delivery routes are configured to allow initially unassigned deliveries only at delivery locations closes to the distribution facility.

BRIEF DESCRIPTION OF THE DRAWINGS

FIG. 5A is a diagram of an Internet screenshot for use in delivery slot selection, according to one embodiment of the present invention.

FIG. 5B is a diagram of a second Internet screenshot for use in delivery slot selection, according to one embodiment of the present invention.

FIG. 6 is a diagram of a third Internet screenshot for use in delivery slot selection, according to one embodiment of the present invention.

FIG. 9 is a diagram of a web page for use in alternative delivery slot selection, according to one embodiment of the present invention.

DETAILED DESCRIPTION

Figure 1:
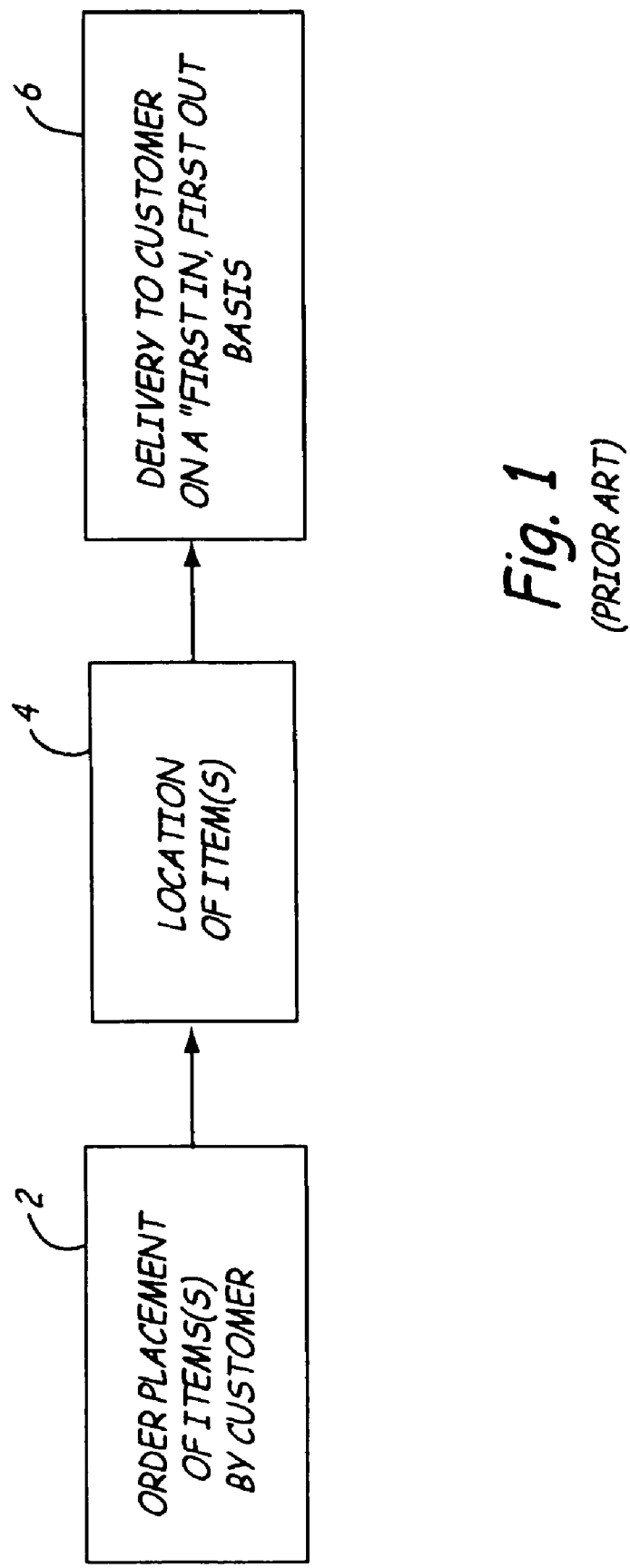
FIG. 1 is a flow diagram of a prior art method of operating a delivery system.
Figure 2:
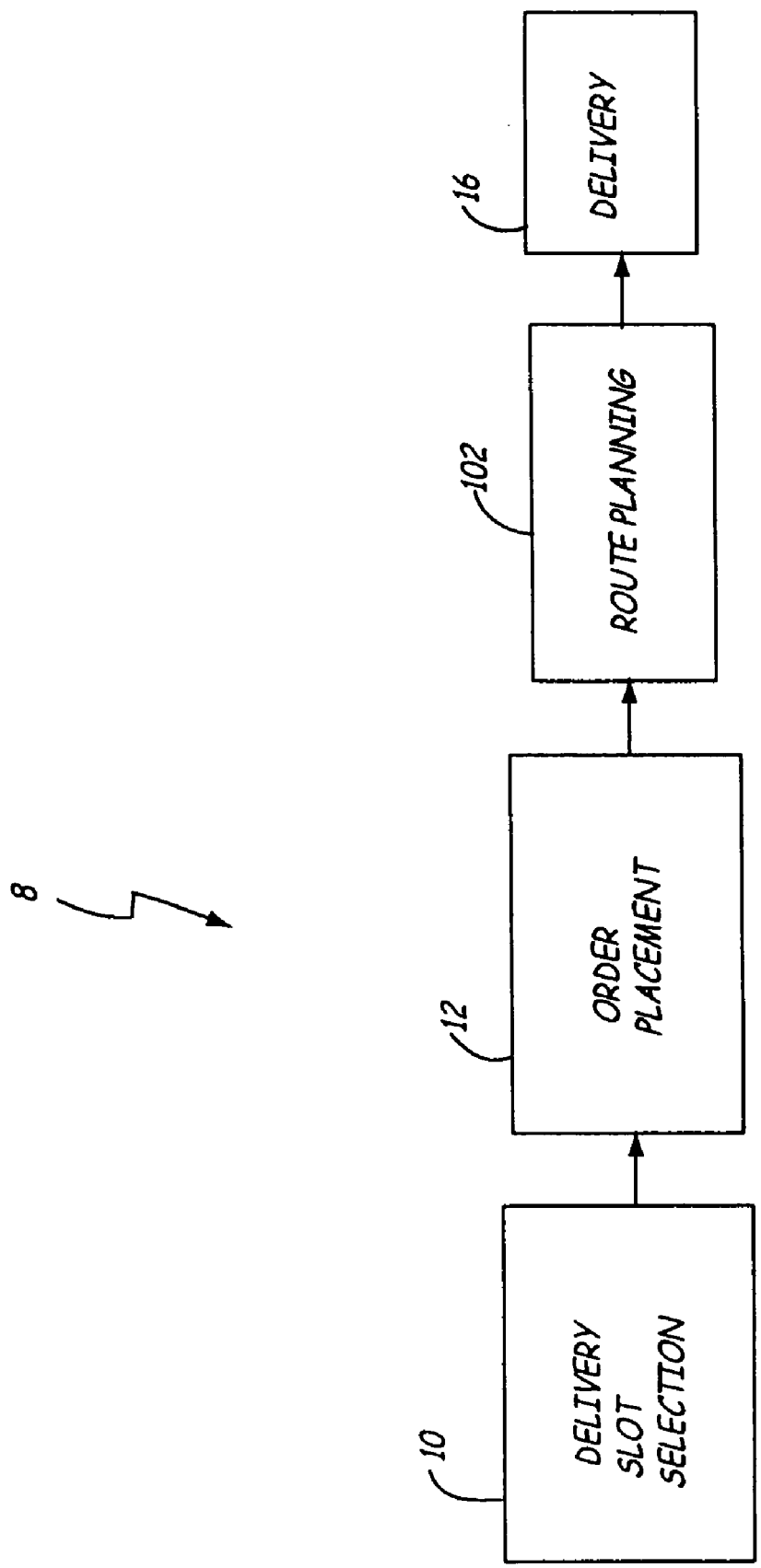
FIG. 2 is a flow diagram of a method of operating a residential delivery system, according to one embodiment of the present invention.

FIG. 2 shows the steps involved in one embodiment of a residential delivery system 8 of the present invention. The invention includes delivery slot selection (block 10) and order placement (block 12) by a customer, route planning (block 102) based on the customer orders, and timely delivery (block 16) of the ordered products to the customer. Alternatively, the system of the present invention may also include order fulfillment of the ordered products in an efficient manner and distribution to distribution facilities to ensure fast delivery. The present invention further encompasses a delivery system that can be used to satisfy any delivery needs of a consumer at any location.

The delivery system of the present invention is based on a recurring delivery period pre-selected by the customer. That is, the system provides discrete time periods during a week, called delivery periods or slots, that are available for selection by the customer as a desired delivery period based on customer location.

Figure 3:
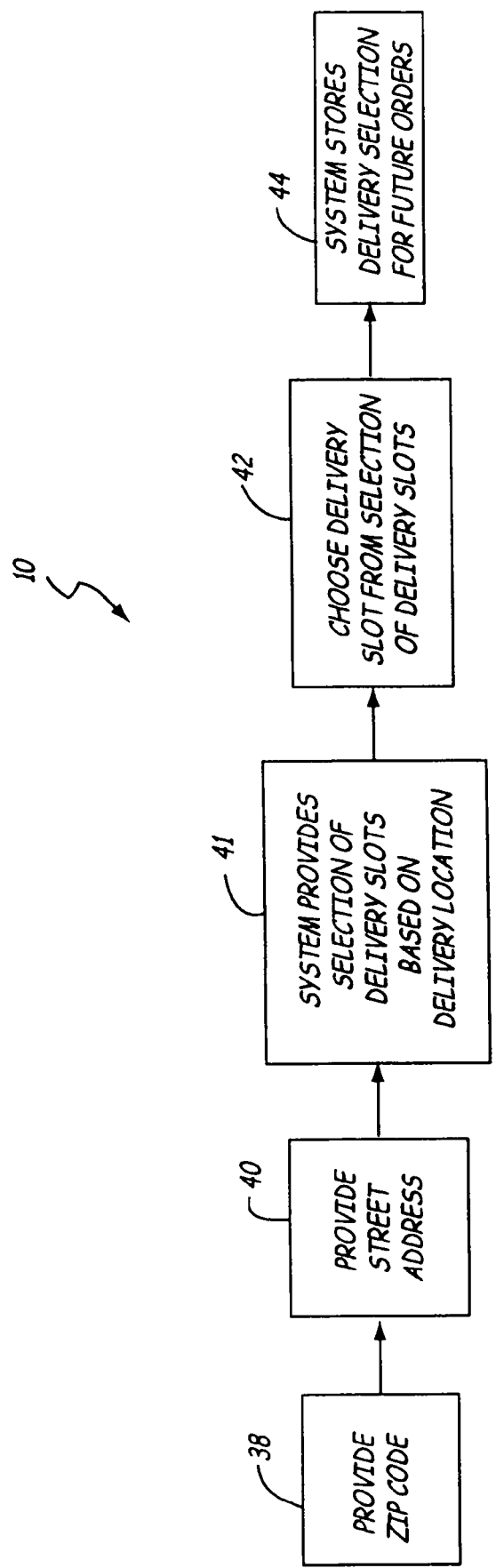
FIG. 3 is a flow diagram of a method of delivery slot selection, according to one embodiment of the present invention.

Delivery slot selection 10 according to one embodiment of the present invention is depicted in FIG. 3. The customer provides a zip code (block 38) and street address (block 40) for the desired delivery location. Alternatively, the customer provides only a street address or only a zip code. In a further alternative, the customer provides any information known to identify a delivery location.

Based on which delivery area, or "delivery sector," the desired delivery location falls in, the system provides a selection of delivery slots (block 41). By providing several delivery options, including various days and times during the day, the system provides flexibility to accommodate each potential customer's busy schedule. According to one embodiment, the system provides at least one delivery slot during each available day of the week and further provides at least one delivery slot during each available time period during the week. Alternatively, the system provides at least one delivery slot during a majority of the available days of the week and further provides at least one delivery slot during a majority of available time periods during the week.

The selection of delivery slots varies according to delivery sector. The selection for a particular delivery sector is based, according to one aspect of the invention, at least in part on the selection of delivery slots available for adjacent delivery areas, as will be further explained below.

In one embodiment, the system provides the selection of delivery slots (block 41) from an overall total of six potential two-hour delivery slots each business day of the week. Alternatively, the system may have fewer or more potential delivery slots consisting of shorter or longer periods. In a further alternative, there may be potential delivery slots available during weekend days or fewer delivery days available during the week.

According to one embodiment, along with the selection of delivery slots, the system also provides the customer with information regarding a predetermined deadline for ordering in order to receive products during the desired delivery slot. In one aspect of the present invention, the system establishes a periodic deadline for submitting an order to ensure delivery during the predetermined delivery slot. Having a predetermined deadline allows the system to process and analyze each order and provide for efficient and economical fulfillment and delivery of each order. The deadline may vary based on the time period of the delivery slot. In one embodiment, the deadline is 7 p.m. for a morning delivery the next day and 11 p.m. for afternoon or evening delivery slots. Alternatively, the deadline is set as any time established as the appropriate cut-off for receiving orders in a manner that allows the system to successfully fulfill and deliver the order in a feasible manner mutually beneficial for the customer and the system of the present invention.

As shown in FIG. 3, the customer chooses one delivery slot from the selection of delivery slots (block 42) provided by the system. The system stores the customer's delivery slot selection for future orders (block 44). According to one embodiment, once the delivery slot has been selected by the customer, the chosen delivery slot becomes the customer's permanent weekly delivery slot. That is, whenever the customer orders products for delivery, the system delivers those products during the chosen delivery slot. For example, if a customer chooses a delivery slot of 7-9 p.m. on Tuesdays, then in the future when the customer places an order prior to the predetermined deadline, the customer will receive the ordered products between 7 p.m. and 9 p.m. on the following Tuesday.

Figure 4:
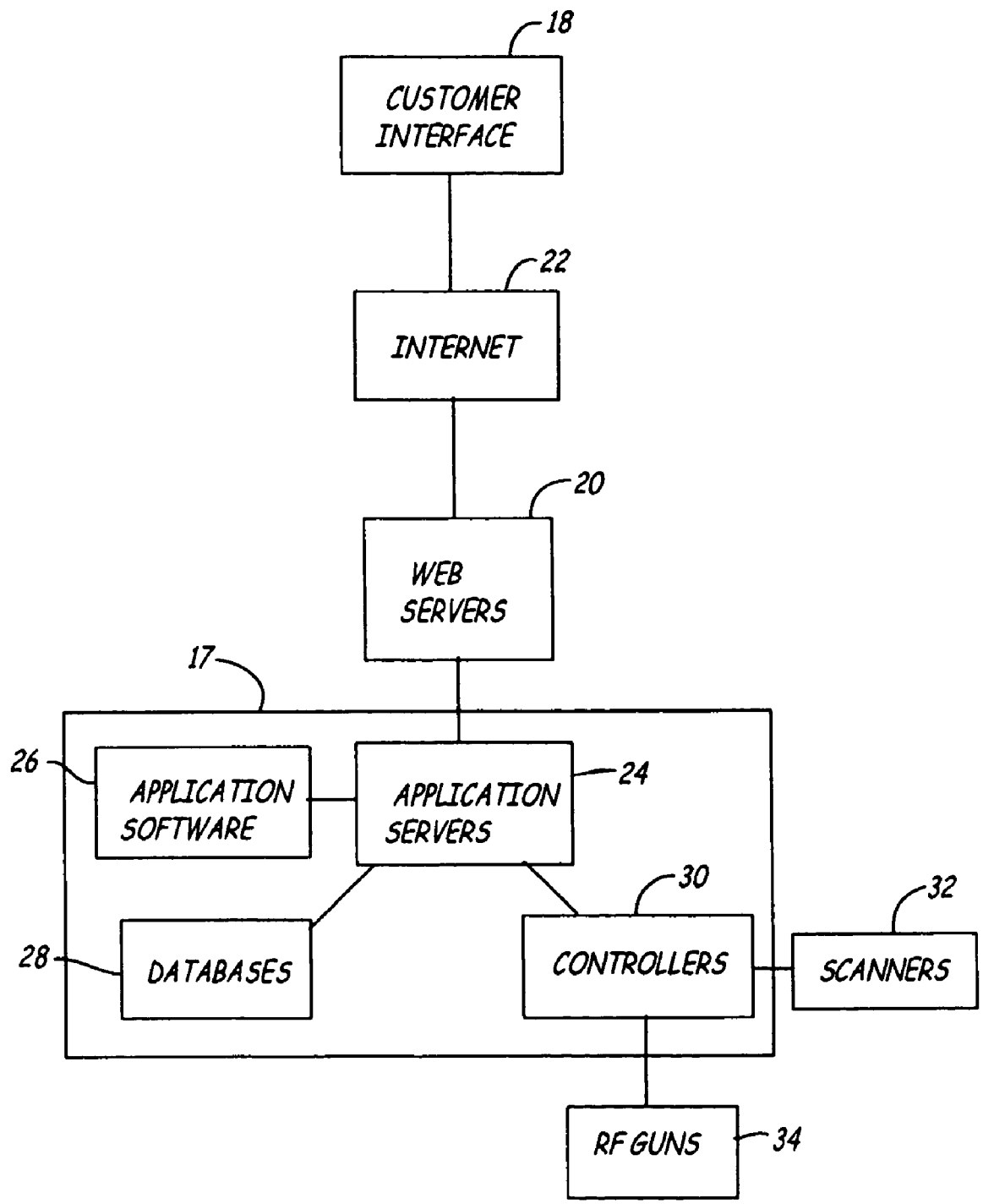
FIG. 4 is a schematic diagram of hardware components of a residential delivery system, according to one embodiment of the present invention.

The present invention is a delivery system. In one aspect of the invention, the system is network-based. FIG. 4 shows the architecture of an Internet-based system according to one embodiment of the present invention. The system includes a server 17 in communication with a customer interface 18 over the Internet 22. According to one embodiment, the customer interface 18 is a website hosted by a plurality of web servers 20. The server 17 includes application servers 24 that include application software 26, databases 28, and controllers 30. The controllers 30 are connected to external devices such as scanners 32 or radio frequency ("RF") guns 34.

Delivery slot selection 10 can be performed by a customer at the customer interface 18. For instance, in one embodiment of the present invention, the customer selects a delivery slot through his/her personal computer by accessing the customer interface 18 at a specified website. Delivery slot selection and availability information is provided to the customer interface 18 from the databases 28 and application servers 24. Once a customer selects a slot at the interface 18, the slot choice is transmitted to the server 17 via the Internet 22. Alternatively, the order can be transmitted to the server 17 over any computer network.

FIGS. 5A, 5B, and 6 depict screenshots of Internet pages that may be used at the customer interface 18 by the customer to select a delivery slot 10. FIG. 5A depicts one embodiment of an Internet screenshot allowing the customer to provide a zip code (block 38). FIG. 5B depicts a screenshot providing for street address entry by the customer (block 40), according to one aspect of the invention. Additionally, FIG. 6 provides a screenshot of the selection of delivery slots (block 41) for the customer to choose from (block 42). Alternatively, delivery slot selection is made by mail, by telephone, or by any other known method for placing a delivery order.

Figure 7:
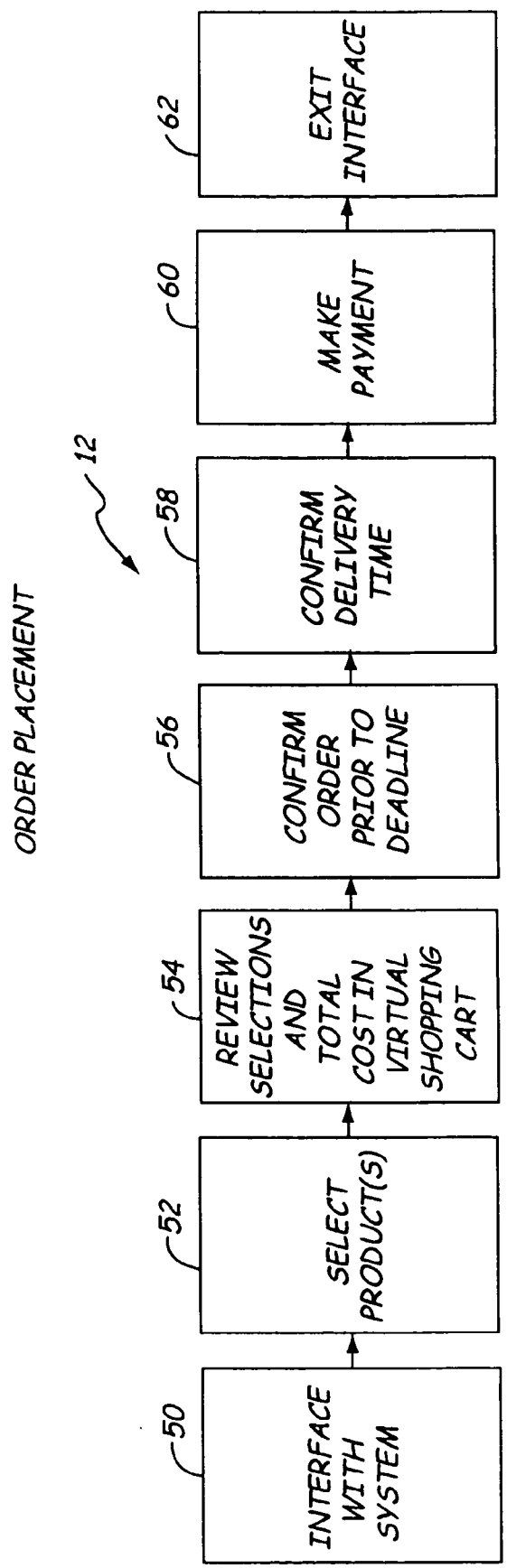
FIG. 7 is a flow diagram of a method of order placement, according to one embodiment of the present invention.

Once a customer has selected a delivery slot 10, the customer can immediately place an order 12 or place an order at a later time. FIG. 7 shows a method of order placement 12 according to one embodiment of the present invention. To place an order, a customer interfaces with the system (block 50). Alternatively, the customer may place an order without using the network, communicating the order by any known method. For example, the order may be placed by mail or by telephone. The customer selects a product or products (block 52). After product selection (block 52), the customer can review the selections and the total cost in a virtual shopping cart (block 54), confirm the order prior to a predetermined deadline (block 56), and confirm the pre-selected delivery time (block 58). Alternatively, the customer can review and confirm the details of the order without a network or a computer. Before exiting, the customer can make payment (block 60) for the entire order. Payment is made by credit card. Alternatively, payment is made by any known method for paying for products or services delivered by a delivery system. If using a network, the customer exits the customer interface (block 62) after making payment (block 60).

As with delivery slot selection 10, order placement 12 can be performed by a customer at the customer interface 18. Upon placement of the order by the customer, the application servers 24, with the assistance of the application software 26, the databases 28, the controllers 30, and such external devices as scanners 32 and RF guns 34, use the order information to fulfill the order 14 and deliver (block 16) the ordered products to the customer.

While the present invention is generally a route-based delivery system providing a single predetermined delivery slot for a customer, the system according to one embodiment also provides a unique flexibility. That is, the system can include an opportunity for the customer to select an alternative delivery slot on a temporary basis. For example, perhaps a customer has other obligations that prevent the customer from being available during the period of the customer's pre-selected delivery slot. The system provides an option for the customer to select an alternative delivery slot. Thus, the system of the present invention includes the efficiency and dependability of its "delivery slot" approach while also including some flexibility similar to that available in an "on-demand" system.

Figure 8:
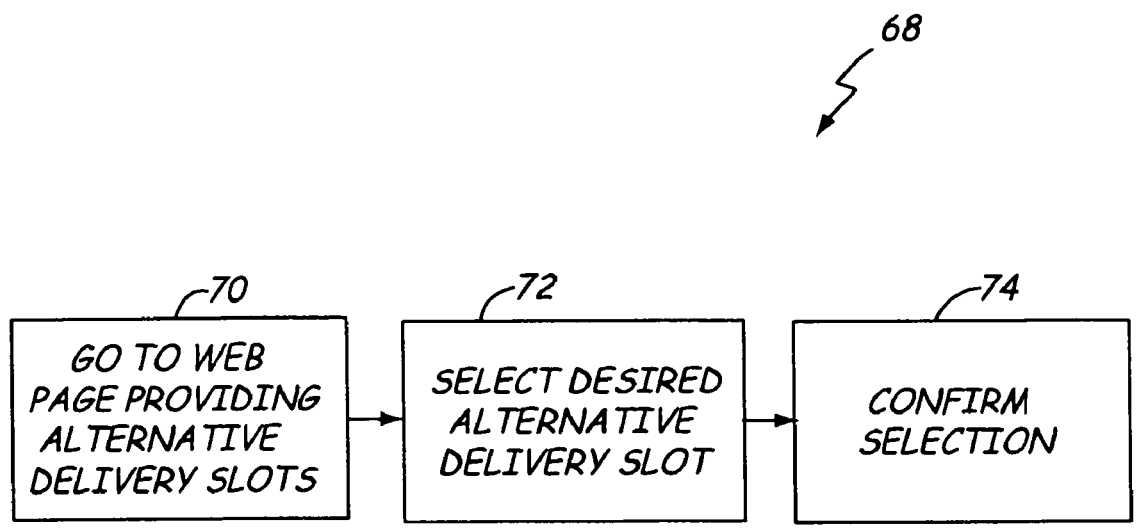
FIG. 8 is a flow diagram of a method of alternative delivery slot selection, according to one embodiment of the present invention.

A method of selecting an alternative delivery slot 68 according to one embodiment is depicted in FIG. 8. The system of the present invention provides the customer an opportunity during order placement 12 to confirm the customer's delivery slot (block 58 of FIG. 7). The customer may select an alternative delivery slot during confirmation. Alternatively, the customer need not be placing an order to select an alternative delivery slot, but rather can select an alternative delivery slot at any time. During order placement, rather than confirm the pre-selected delivery slot, the customer visits a webpage providing alternative delivery slots (block 70). Alternatively, the system communicates alternative delivery slots to the customer by any known medium, including mail or telephone.

The available alternative delivery slots typically coincide with the selection of delivery slots originally available to the customer. The customer selects the desired alternative delivery slot (block 72) from the available alternatives. Alternatively, the customer can select the alternative delivery slot by any known method, including mail or telephone. In one embodiment, the customer then confirms the selection (block 74) before completing the order placement process 12. FIG. 9 depicts an example of a webpage provided by the system for selecting an alternative delivery slot, according to one embodiment.

Figure 10:
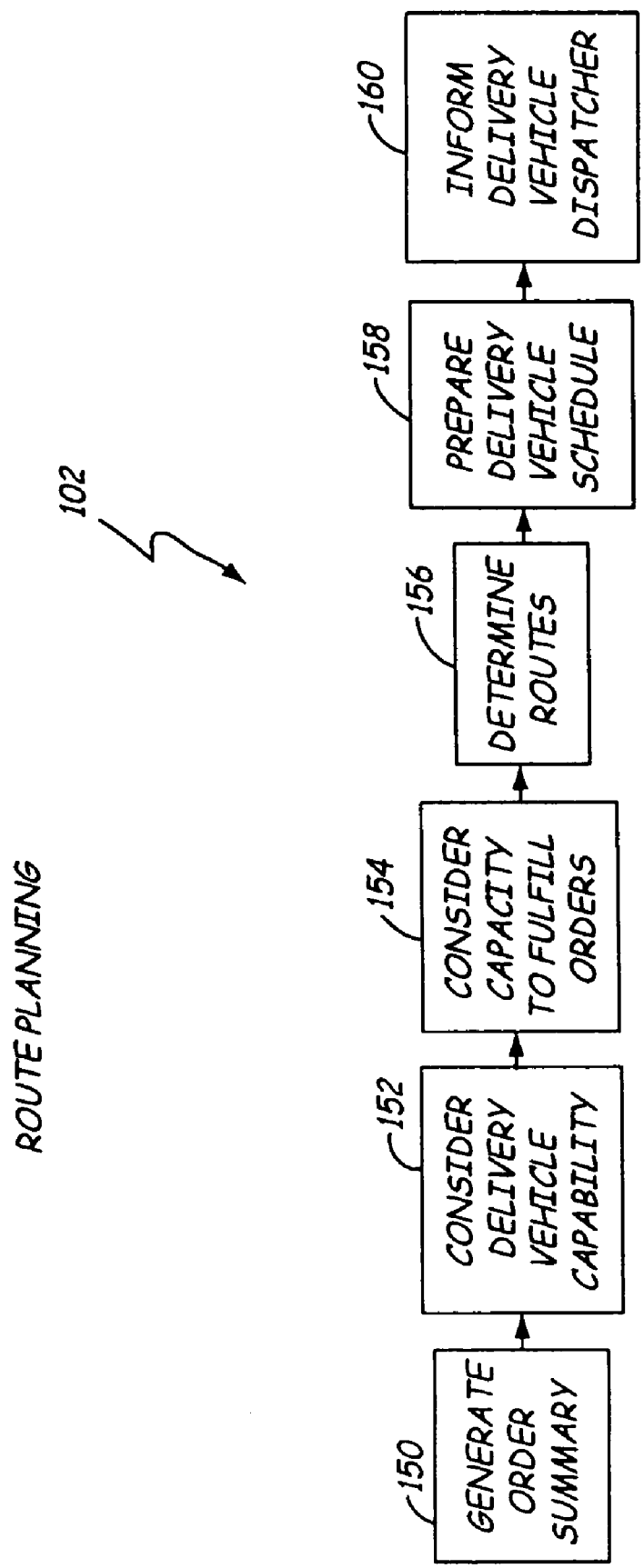
FIG. 10 is a flow diagram of a method of route planning, according to one embodiment of the present invention.

After order placement 12, the system provides for delivery route planning 102. FIG. 10 shows a method of delivery route planning 102 according to one embodiment of the present invention. By anticipating and planning for the delivery routes required to deliver every order during the delivery period, the system provides for efficient, timely delivery. After an order summary is generated (block 150) for review and delivery vehicle availability (block 152) and capacity to fulfill orders (block 154) are considered, the routes are determined (block 156). Using route information, a delivery vehicle schedule is prepared (block 158) and a delivery vehicle dispatcher is informed of the schedule (block 160).

Figure 11:
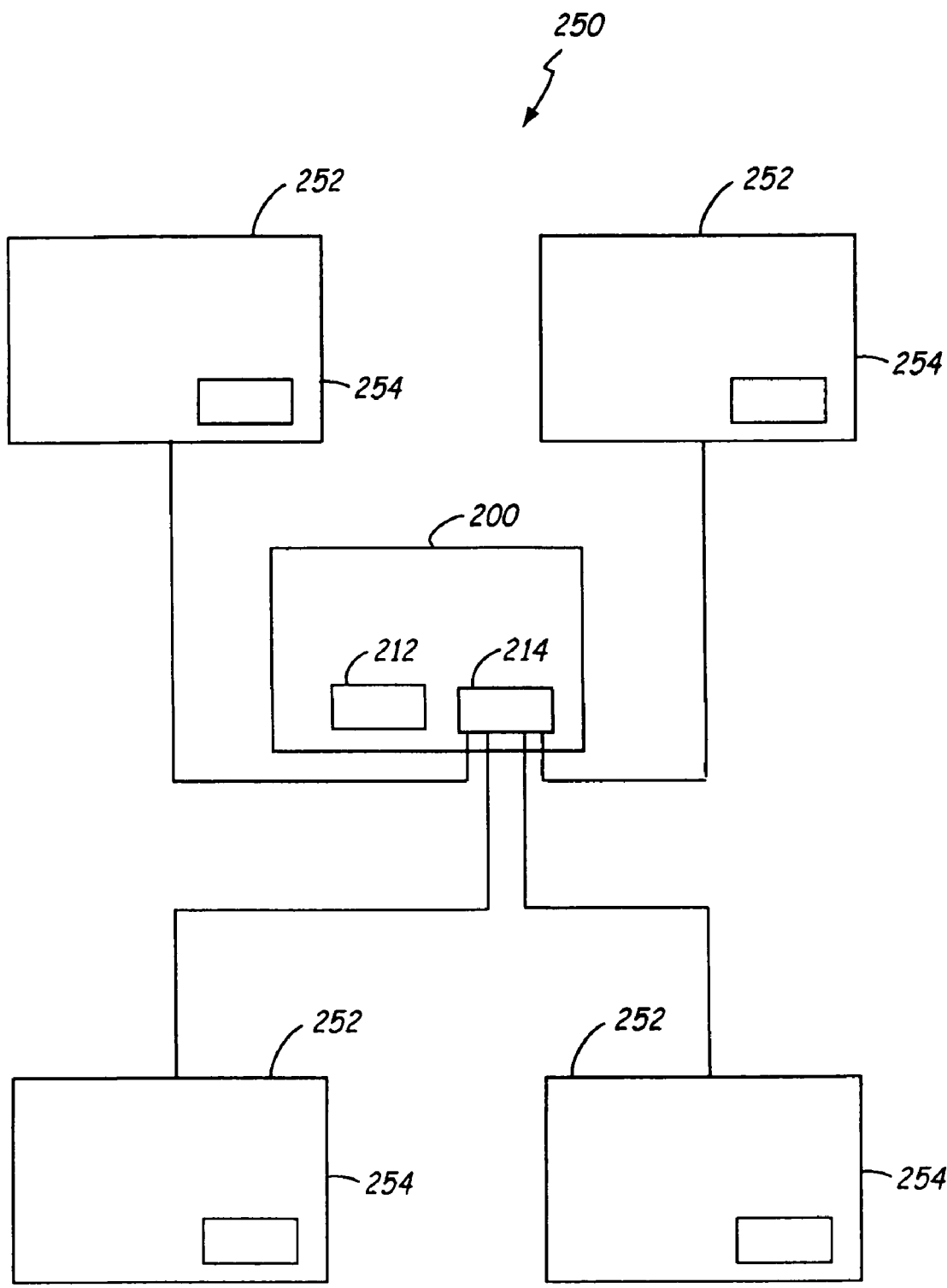
FIG. 11 is a schematic diagram of a distribution system, according to one embodiment of the present invention.
Figure 12:
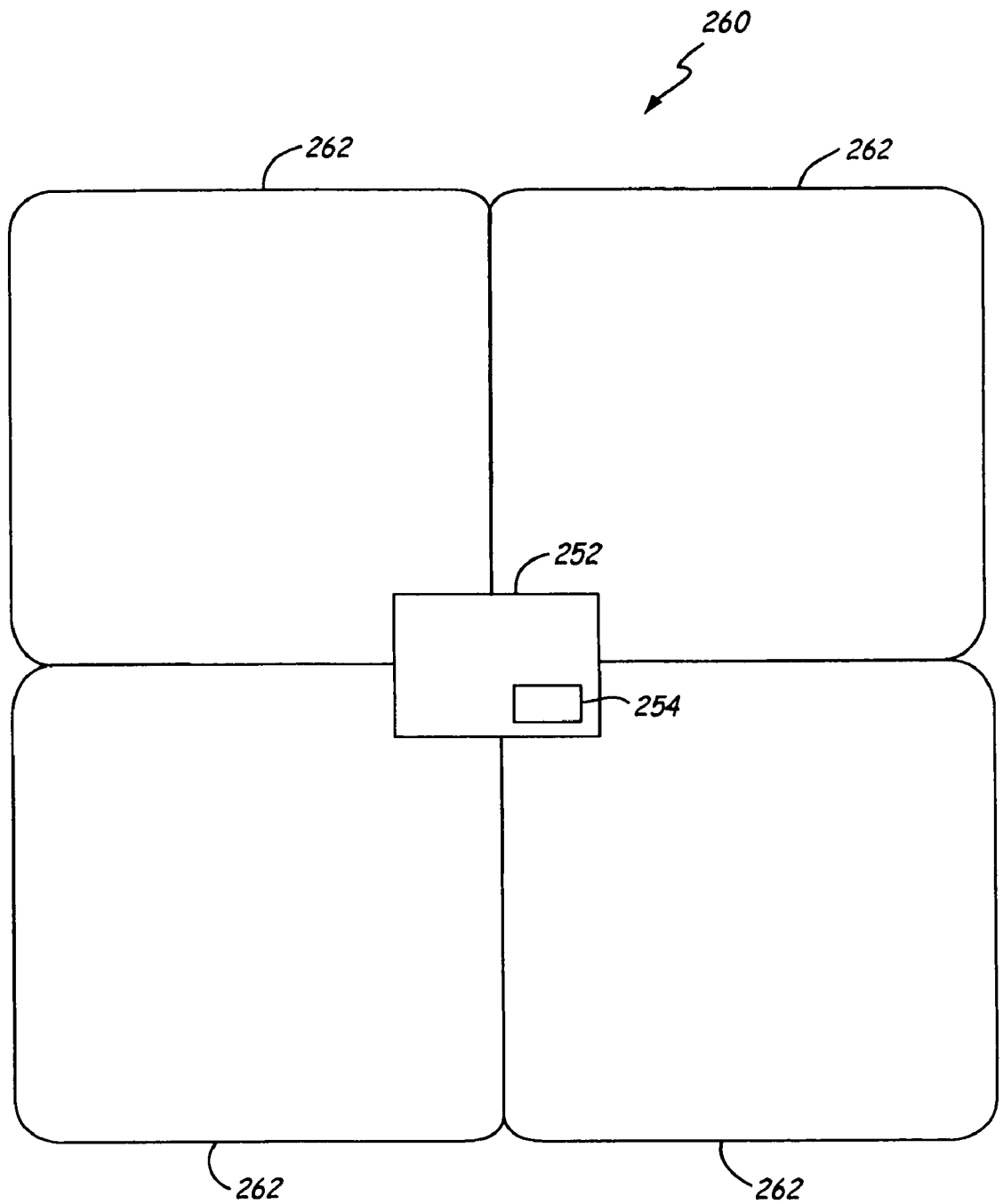
FIG. 12 is a schematic diagram of a delivery system, according to one embodiment of the present invention.
Figure 13:
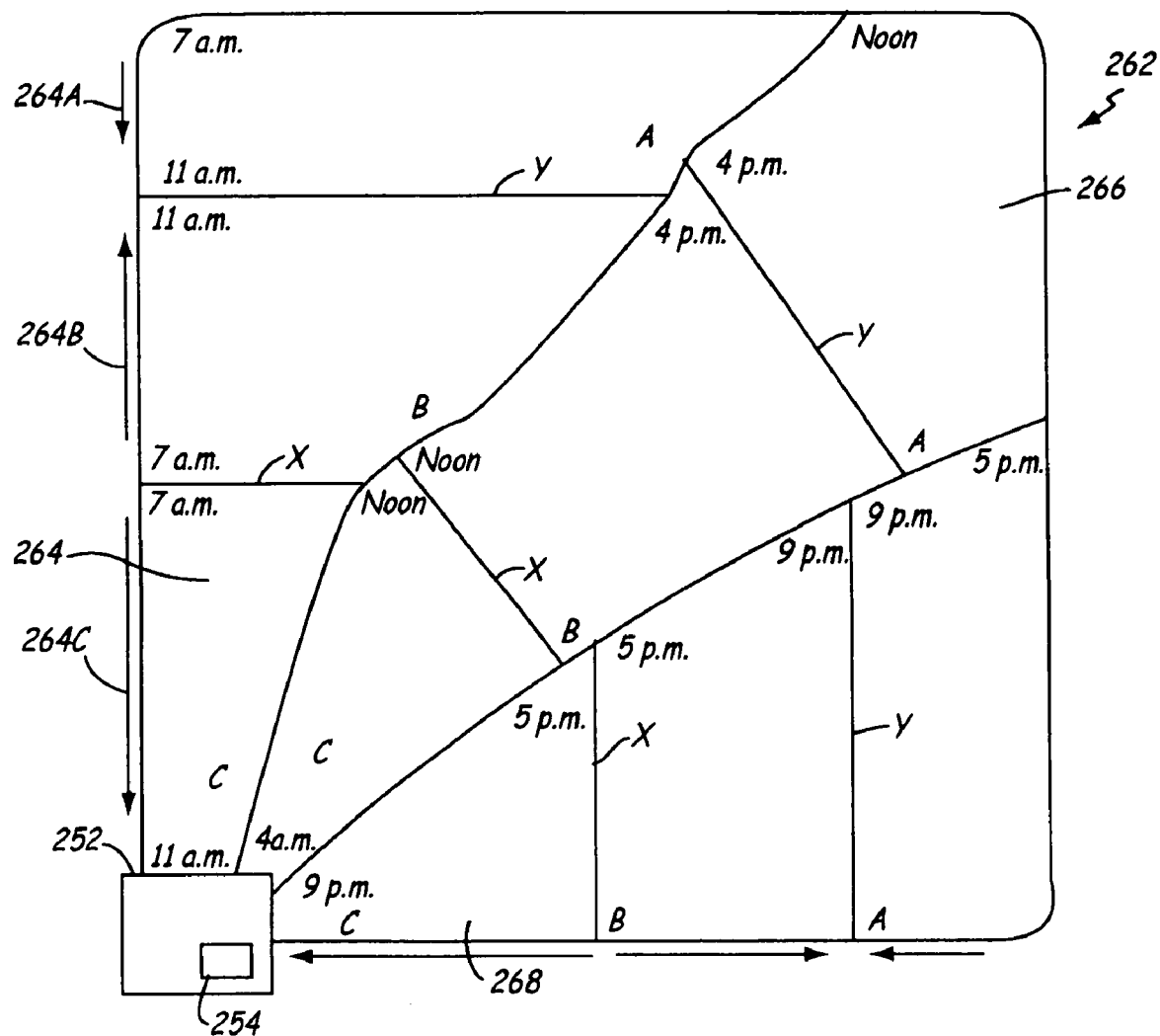
FIG. 13 is a schematic diagram of a delivery system sector, according to one embodiment of the present invention.

Route determination (block 156) may in large part depend on the structure of the delivery system. FIGS. 11-13 depict the structure of a delivery system according to one embodiment of the present invention. FIG. 11 depicts the structure of a distribution system 250. The distribution system 250 of the present invention centers on a central hub 200. The hub 200 may include a local delivery area 212 and a facility delivery area 214. Alternatively, the hub may have only a facility delivery area 214. The local delivery area 212 is an area for preparation and load of products for delivery to local customers. The facility delivery area 214 allows for the preparation and loading of products for distribution to any of a plurality of satellite distribution facilities 252. Each of these distribution facilities 252 includes its own delivery area 254 from which products are delivered to the customer.

FIG. 12 depicts a typical satellite distribution area 260, according to one embodiment of the present invention. Products received at the distribution facility 252 from the hub 200 are subsequently delivered to customers in one of the delivery sectors 262 adjacent to the facility 252. There are four delivery sectors 262 in the satellite distribution area 260 in FIG. 12. Alternatively, the system may provide from 1 to any number of delivery sectors 262, wherein the number of sectors may be dependent on such factors as geography of the area surrounding the facility 252, the population of the area surrounding the facility 252, the number of customers in the area surrounding the facility 252, etc.

Figure 13A:
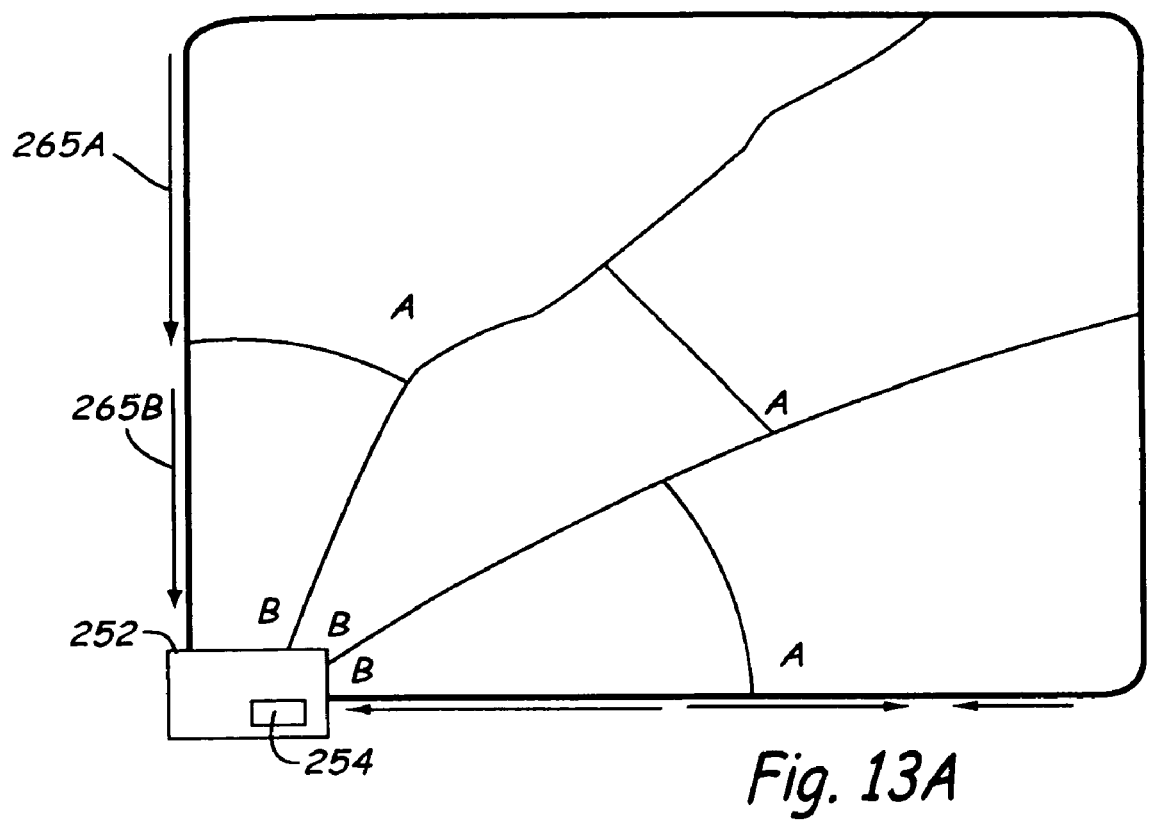
FIG. 13A is a schematic diagram of another delivery system sector, according to one embodiment of the present invention.
Figure 13B:
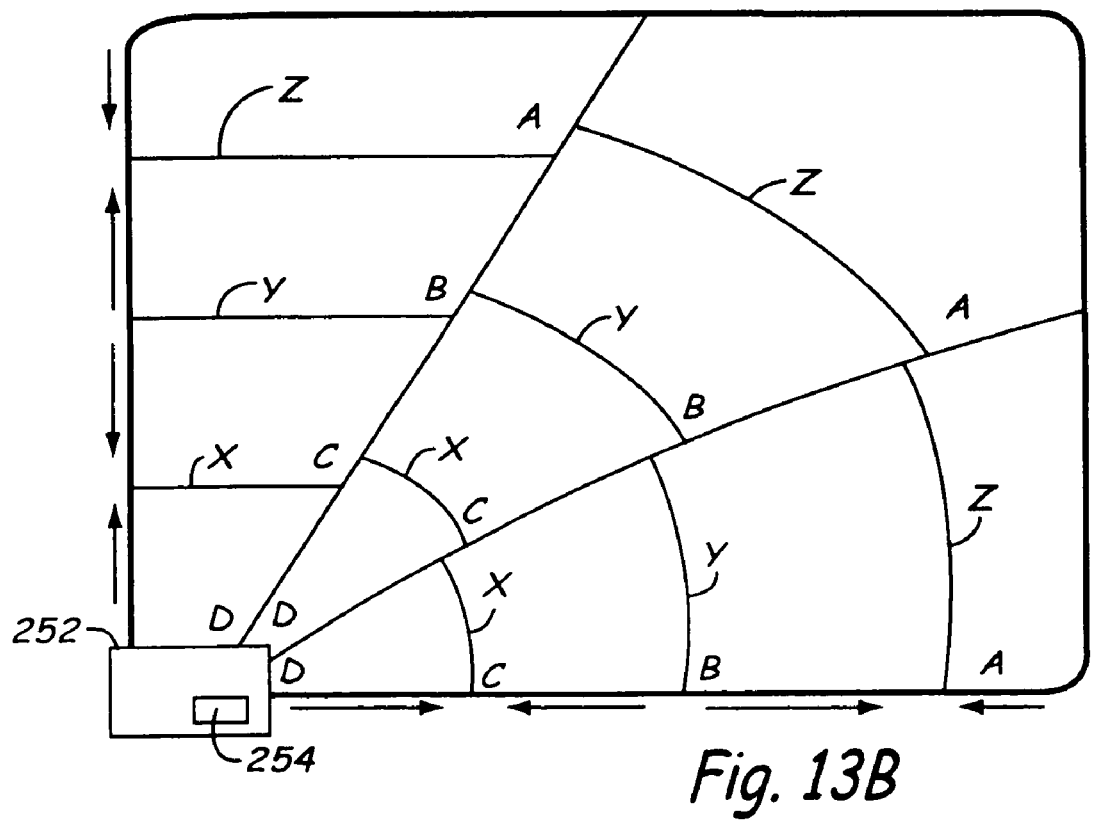
FIG. 13B is a schematic diagram of a further delivery system sector, according to one embodiment of the present invention.

FIG. 13 depicts a typical delivery sector 262, according to one embodiment of the present invention. The delivery sector 262 has three subsectors 264, 266, and 268. Alternatively, each delivery sector of the present invention may include fewer than three or more than three subsectors. Each subsector 264, 266, and 268 in FIG. 13 is divided by route borders X and Y into three route areas A, B, and C. Each route area is the geographic area to which each route is limited. Thus, each subsector has three delivery routes. Alternatively, a subsector may have as few as one route area (and thus one route) or as many as may be necessary to provide for efficient and timely delivery for each customer in a subsector who has placed an order. For example, each subsector may have two route areas as shown in FIG. 13A, or four route areas as shown in FIG. 13B. For each subsector, route area A is located in the area of the subsector farthest from the distribution facility 252. For example, in subsector 264, route area A is located in the far portion of subsector 264 with respect to the distribution facility 252.

The delivery system of the present invention provides a unique route flexibility that prevents delivery inefficiencies common in prior delivery systems. That is, while prior delivery systems occasionally required the dispatch of an additional delivery vehicle to distant delivery areas far removed from the distribution facilities, the present invention insures that any additional delivery resources are required only in areas in close proximity with the distribution facility.

Figure 14:
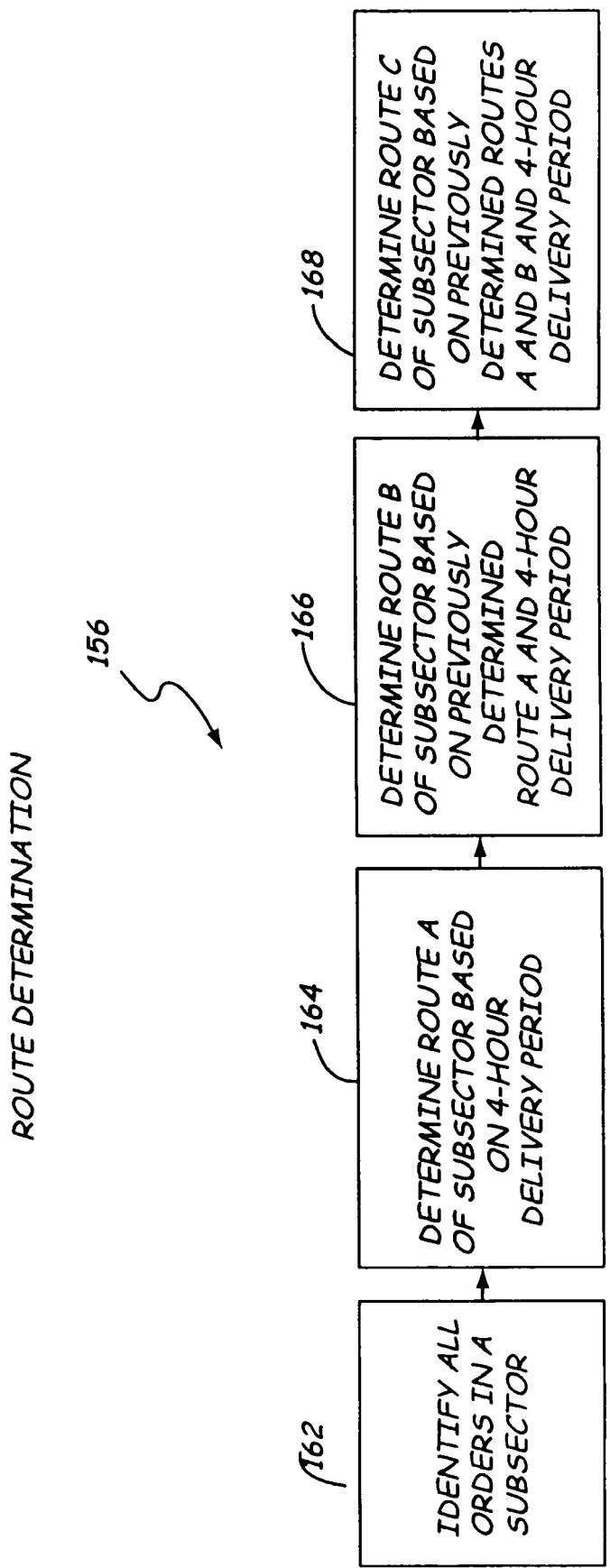
FIG. 14 is a flow diagram of a method of route determination, according to one embodiment of the present invention.

Delivery routes are determined as part of delivery route planning 102. FIG. 14 depicts a method of route determination 156, according to one embodiment of the present invention. The system identifies all orders in a subsector (block 162). Once all orders to be delivered to a particular subsector have been identified, the system determines the routes in route areas A, B, and C of the subsector based on a four-hour delivery period for each subsector. Alternatively, the delivery periods for the orders in a subsector may be any length of time allowing for completion of the deliveries.

Given that each delivery route is determined based on a set, predetermined delivery period, the size of each delivery area can vary depending on the number of orders placed. That is, if there are few orders placed by customers in a particular delivery area, the delivery vehicle will be able to travel a greater distance in the allotted delivery period than if there were many orders placed in that area, thus resulting in a longer delivery route and therefore a larger route area on that particular day. In this case, that would mean the route border would be moved to reflect a larger route area. For example, if there are few deliveries in route area A of subsector 264, the delivery vehicle would travel a greater distance, thus resulting in a longer route. Given the longer route, the route border Y would be moved to a location closer to the distribution facility 252 than presently depicted in FIG. 13. On the other hand, if there are many orders placed by customers in route area A of subsector 264, the delivery vehicle will travel a shorter distance in the allotted delivery period, thus resulting in a smaller route area A on that particular day, meaning that the route border Y would be moved farther from the distribution facility 252 than presently depicted. Every route is similarly variable on a daily basis. Hence, each route area is variable, with the location of the route borders changing from day to day as required by the number of deliveries in each route area.

The route and route area flexibility is important for route determination 156 as depicted in FIG. 14. According to one embodiment, the system first determines the route in the route area farthest from the distribution facility, and then progressively makes route determinations in each route area closer to the distribution facility. For a system with three route areas as depicted in FIG. 13, the system determines the route in route area A based on a 4-hour delivery period (block 164) and an operator manually manipulates the route as desired. Alternatively, the determination of the route in route area A (block 164) is completed with no operator input. Once the route in route area A has been determined (block 164), the size of route area A and the location of route border Y is known. Given this knowledge, the route in area B of the subsector can be determined. The route in route area B is established based on the previously determined route in route area A and the four hour allotment for delivery (block 166). The route in route area B may be manually altered by an operator or determined by the system with no operator input. Once the route in route area B has been determined, the size of route area B and the location of route border X is known. Given this knowledge, the route in route area C of the subsector is determined based on the previously determined routes in route areas A and B and the four-hour delivery period (block 168). The route is determined by the system and can subsequently be altered by an operator. Alternatively, the route is determined entirely by the system of the present invention with no operator input.

By determining the routes in the manner described above, the delivery system 16 of the present invention can deliver products in the most efficient manner possible. Using the route determination method according to one embodiment of the present invention, any additional delivery locations that cannot be included in the initial routes because of capacity issues ("initially unassigned deliveries") are located in close proximity to the distribution facility 252. That is, by determining routes based on (1) the number of orders and (2) a method of first determining the route farthest from the distribution facility and then progressively making determinations of routes closer to the facility, any initially unassigned deliveries will inevitably be at those locations closest to the distribution facility. Then, the initially unassigned deliveries can be addressed by simply dispatching an additional vehicle during delivery, as explained below, thus minimizing additional travel time and expenses as a result of the proximity.

Figure 15:
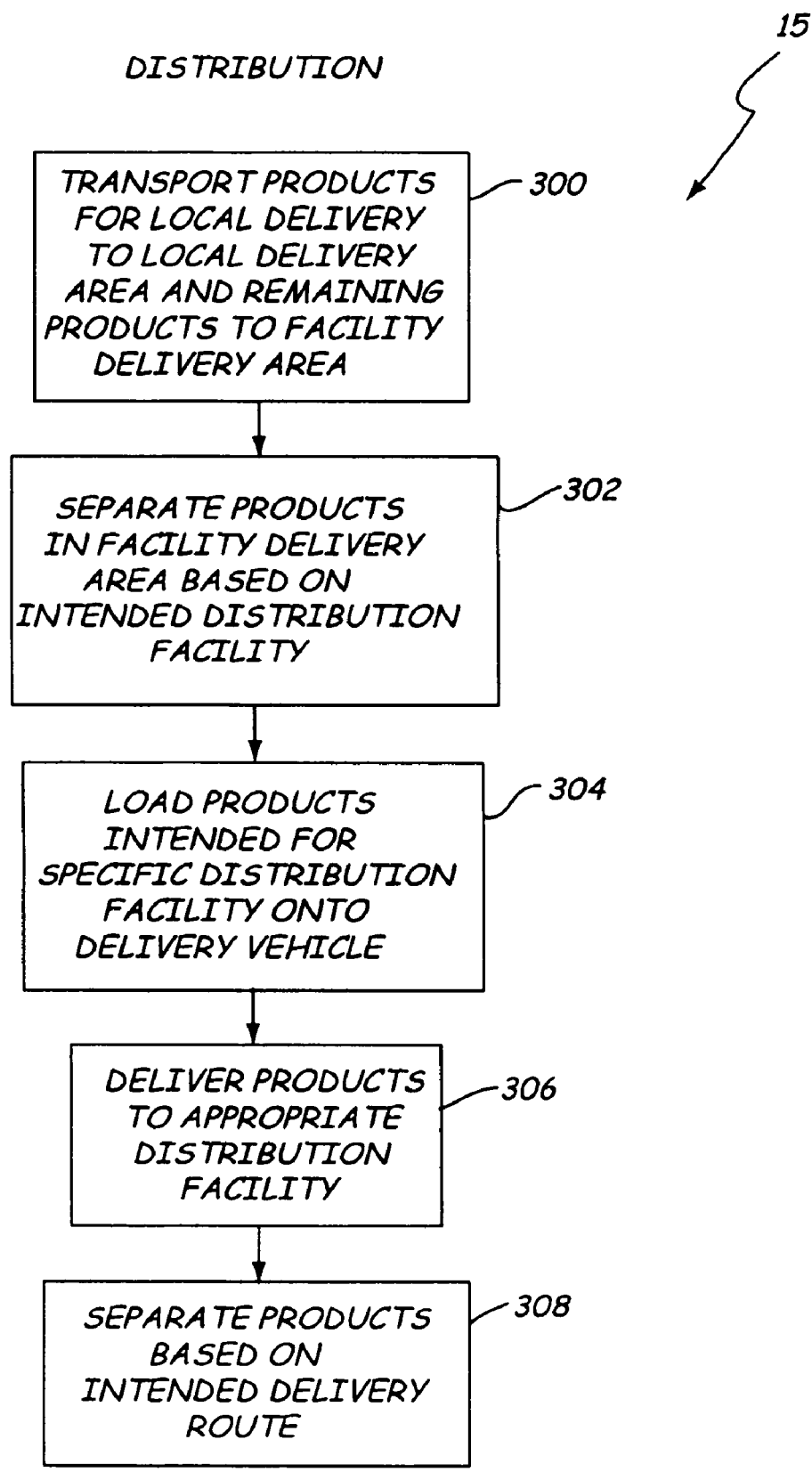
FIG. 15 is a flow diagram of a method of distribution, according to one embodiment of the present invention.

Once the delivery routes have been determined 156, the ordered products can be distributed. FIG. 15 depicts a method of distribution 15 according to the present invention. Products for local delivery are transported to the local delivery area and the remaining products are transported to the facility delivery area (block 300). Alternatively, products at the hub 200 are delivered directly to the appropriate customers from the local delivery area 212. In the facility delivery area, products are separated based on the intended distribution facility (block 302), and loaded onto the appropriate delivery vehicle (block 304) for transport to the facility. Once the products are transported to the appropriate distribution facility (block 306), the products are separated based on the intended delivery route (block 308).

Figure 16:
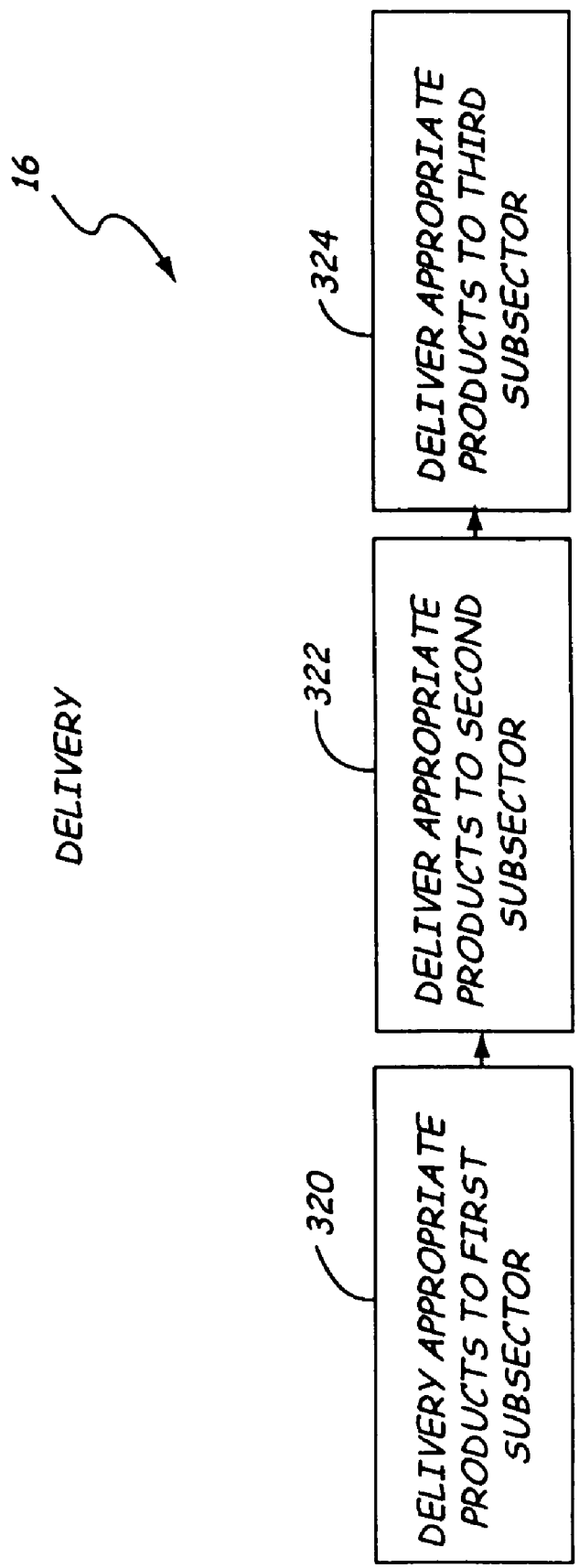
FIG. 16 is a flow diagram of a method of delivery, according to one embodiment of the present invention.

Delivery occurs from the distribution facility. Alternatively, delivery may occur directly from the hub 200. FIG. 16 depicts a method of delivery 16 according to one embodiment of the present invention. The delivery system of the present invention provides for delivery efficiencies and structure that allow consistent and timely delivery of products on established delivery routes. That is, customers get timely delivery of their products by the same delivery personnel on a regular basis. To ensure this reliable delivery by recognizable faces, appropriate products are delivered in a delivery sector by first completing delivery in one subsector before moving to a contiguous subsector and completing delivery in that subsector before moving to a next contiguous subsector, and so on. Thus, the method of delivery according to one embodiment includes delivering appropriate products to a first subsector (block 320), subsequently delivering appropriate products to a second subsector contiguous to the first (block 322), and finally delivering appropriate products to a third subsector contiguous to the second (block 324). Alternatively, the order of delivery by subsector may be determined independently of location. In a further alternative, delivery may occur concurrently at each subsector.

Figure 17:
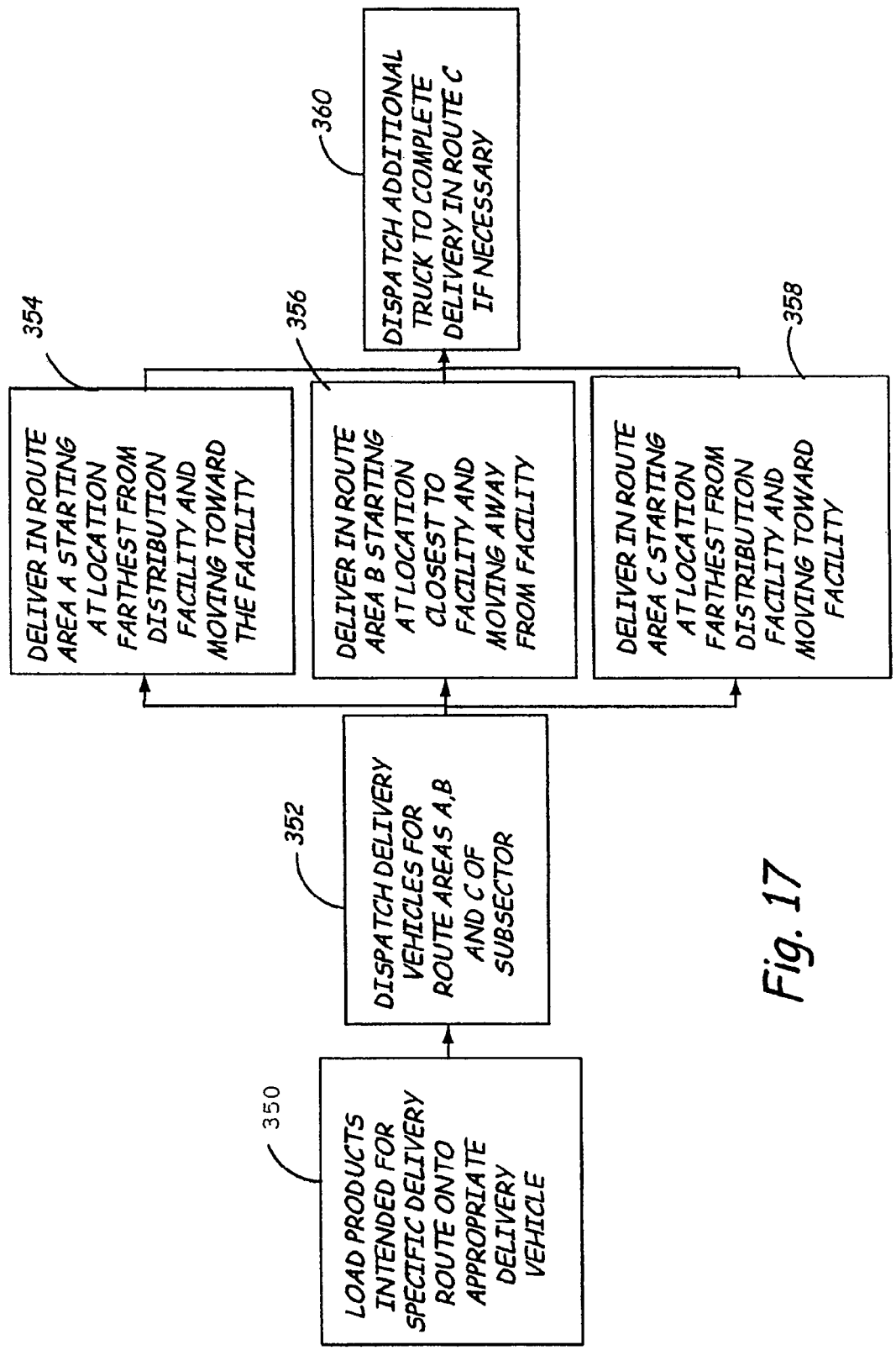
FIG. 17 is a flow diagram of a method of delivery in a subsector, according to one embodiment of the present invention.

FIG. 17 depicts a method of delivery in an individual delivery subsector according to the one embodiment of the present invention. At the distribution facility, products intended for a specific delivery route are loaded onto the appropriate delivery vehicle (block 350). Once the loading of all products for all routes in a subsector is complete, the delivery vehicles for the routes in areas A, B, and C of the subsector are dispatched (block 352). Further, if the route determination process results in one or more initially unassigned deliveries in route area C, an additional vehicle may be dispatched to complete those deliveries. Alternatively, if the subsector has more or less than three delivery areas, the appropriate number of trucks is dispatched. According to one embodiment, delivery occurs at the same time in each of the routes of the subsector.

Delivery at each of the routes may not occur in the same manner. According to one embodiment, route delivery direction is varied to ensure that delivery occurs in the most efficient manner possible. According to one embodiment having three route areas per subsector, delivery in route area A of a subsector starts at the delivery location farthest from the distribution facility and subsequently covers each delivery location in a direction moving towards the facility (block 354). For example, in subsector 264 of FIG. 13, the first delivery in route area A would be at the delivery location in route area A farthest from the distribution facility 252, and every subsequent delivery occurs in a direction toward the distribution facility 252 as depicted by the arrow 264A. Delivery in route area B, on the other hand, starts at the delivery location closest to the facility and the route continues to each delivery location in route area B in a direction away from the facility (block 356) as shown by the arrow 264B. In route area C, delivery starts at the location farthest from the distribution facility and the route then covers every delivery location in a direction moving towards the facility (block 358) as shown by the arrow 264C. By configuring the route in area C to first complete delivery at locations farthest from the distribution facility 252, the system of the present invention further ensures that the initially unassigned deliveries are located in the portion of route area C of the subsector that is closest to the distribution facility. To address these unassigned deliveries, the system according to one embodiment simply dispatches an additional truck to complete delivery in route area C if necessary (block 360).

According to an alternative embodiment, all the deliveries in all the route areas of a subsector may be made in a direction toward the distribution facility, as depicted in FIG. 13A. As the arrows 265A, 265B show, delivery in each delivery area in FIG. 13A starts at the location farthest from the distribution facility 252 and moves toward the distribution facility 252.

In another embodiment, the direction of delivery in the delivery area closest to the distribution facility 252 is in a direction away from the facility 252. For example, FIG. 13B depicts a delivery subsector 267 in which delivery in area D is away from the facility. To ensure that the initially unassigned deliveries are those closest to the distribution facility 252, a predetermined number of delivery locations in the delivery area closest to the distribution facility 252 are left unassigned or "skipped," and the first delivery is made at the first delivery location beyond the unassigned deliveries. Subsequently, a delivery truck is sent to the unassigned locations to complete the delivery process for that subsector.

Figure 18:
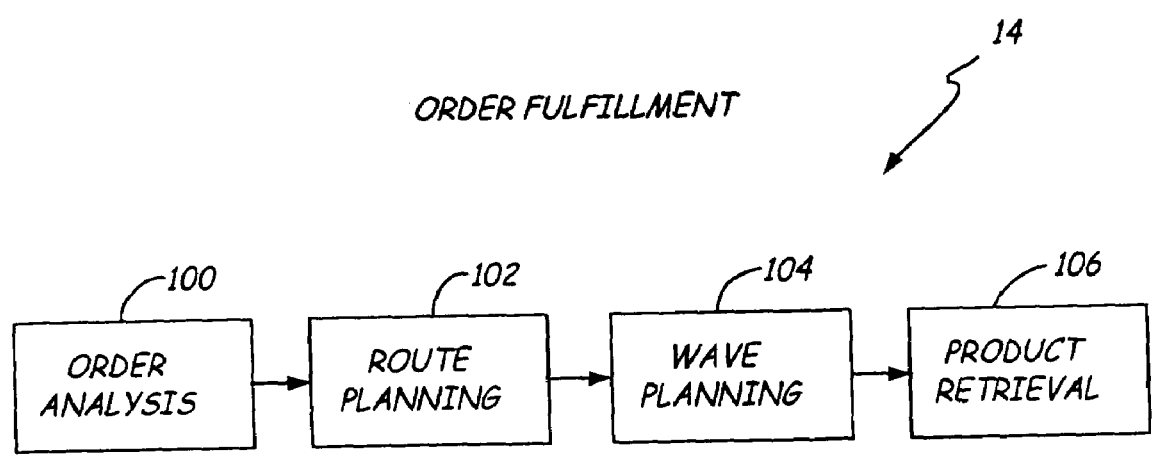
FIG. 18 is a flow diagram of a method of order fulfillment, according to one embodiment of the present invention.

Going back to the pre-delivery process, the present invention in a complex system may also encompass the process of fulfilling the order. In such a system, route planning (block 102) may be an integral part of a larger order fulfillment process 14 as depicted in FIGS. 18-22. After the customer has placed an order, the system of the present invention provides for fulfilling that order in an efficient and economical manner. FIG. 18 shows a method of order fulfillment 14 according to one embodiment of the present invention. To fulfill an order placed by a customer, there may be an order analysis (block 100) by the system. Once all orders for an ordering period have been analyzed, route planning (block 102) and wave planning (block 104) steps may be performed to anticipate the delivery and capacity limitations that determine the timing and other requirements for the product retrieval (block 106) step. Alternatively, the order analysis (block 100) and route and wave planning steps (blocks 102, 104) may be combined or performed in any order to assure that the system has the capacity and capabilities to fulfill every order. Product retrieval (block 106) is a method of assimilating the product or products ordered by the customer.

Figure 19:
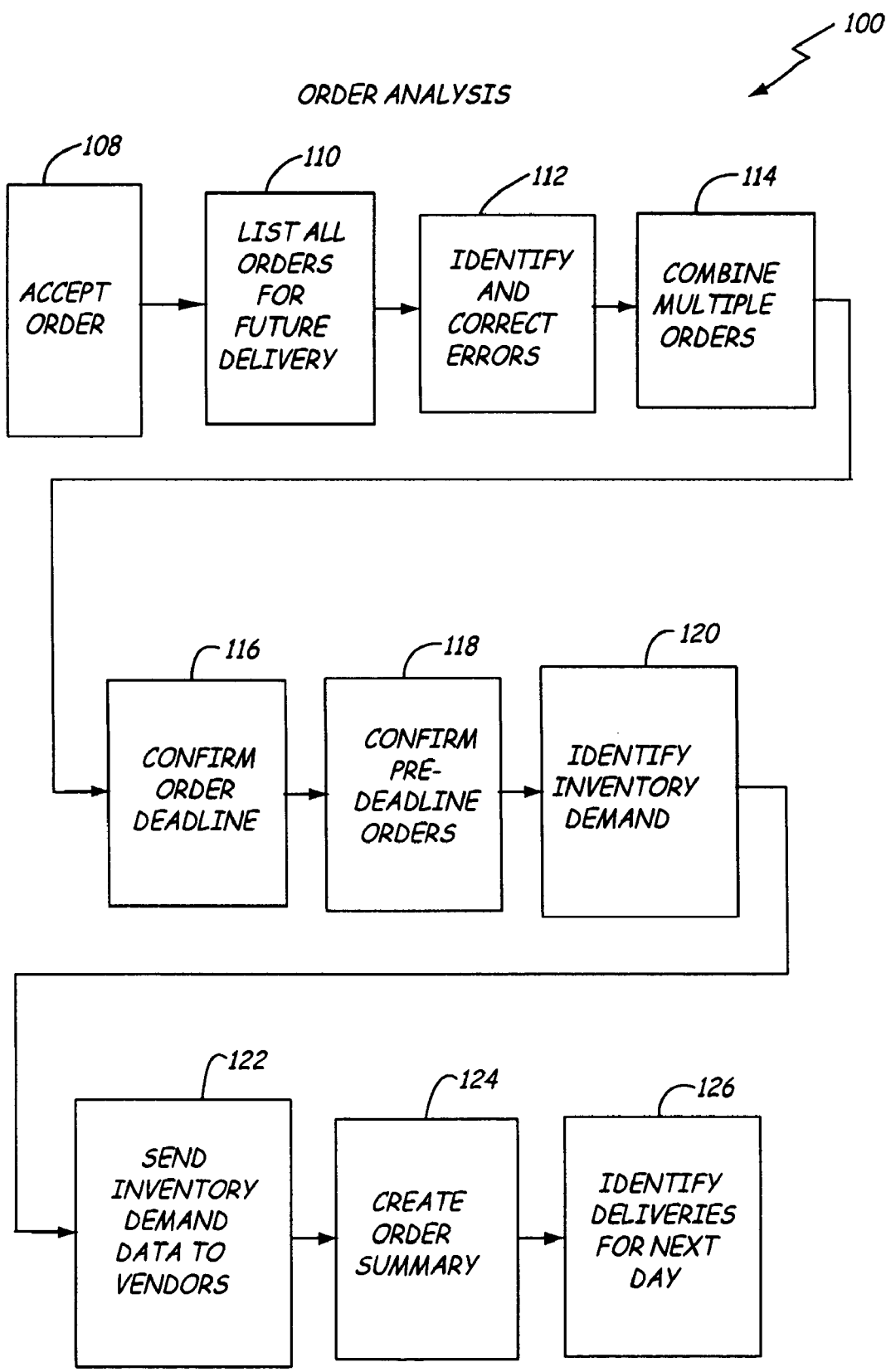
FIG. 19 is a flow diagram of a method of order analysis, according to one embodiment of the present invention.

Once an order is received by an order fulfillment process of the present invention, the order may be analyzed before the products requested in the order are retrieved. FIG. 19 shows a method of order analysis 100 according to one embodiment of the present invention. After the order is accepted (block 108) by the system, all orders for future delivery (e.g., for delivery on a particular day or at a particular time) are compiled and listed (block 110). Once compiled into a list, the orders may be examined for identification and correction of errors (block 112). In one aspect of the invention, an error is related to unusual or erroneous delivery dates. Alternatively, the errors may be related to duplicate orders. If it is further determined that a customer has submitted more than one order, the multiple orders may be combined (block 114).

Once all error corrections (block 112) and multiple order combinations (block 114) have been completed, one embodiment of the present invention calls for confirming the order deadline (block 116) and confirming the pre-deadline orders (block 118). By order deadline confirmation (block 116) and pre-deadline order confirmation (block 118), the system of the present invention distinguishes orders that qualify for delivery the next day from orders that do not and separates the orders. Qualifying orders are considered in identifying inventory demand (block 120) and creating an order summary (block 124), while orders that were not submitted prior to the deadline are not. In one embodiment, the non-qualifying orders become qualifying orders during the next appropriate period and are fulfilled and delivered during that period. Alternatively, the non-qualifying orders are saved for fulfillment and delivery in a later period. As discussed above, the system of the present invention identifies inventory demand (block 120) based on order requests to be fulfilled in the following delivery period. Once the demand is identified, the inventory demand data is sent to the vendors (block 122). According to one embodiment, the vendors use the data to supply further inventory, thus ensuring that the system has a sufficient supply of products to satisfy the customer demand and fulfill all future orders. After confirmation, an order summary is created (block 124) and all deliveries for the next day are identified (block 126) as necessary steps in preparation for fulfillment.

Wave planning 104 is another aspect of an order fulfillment process. A wave is a fulfillment strategy wherein a pre-planned number of orders is undertaken. A wave is determined based on requested delivery times and fulfillment capacity. According to one embodiment, wave and route determination are interrelated. That is, waves and routes may be determined based on related information.

Figure 20:
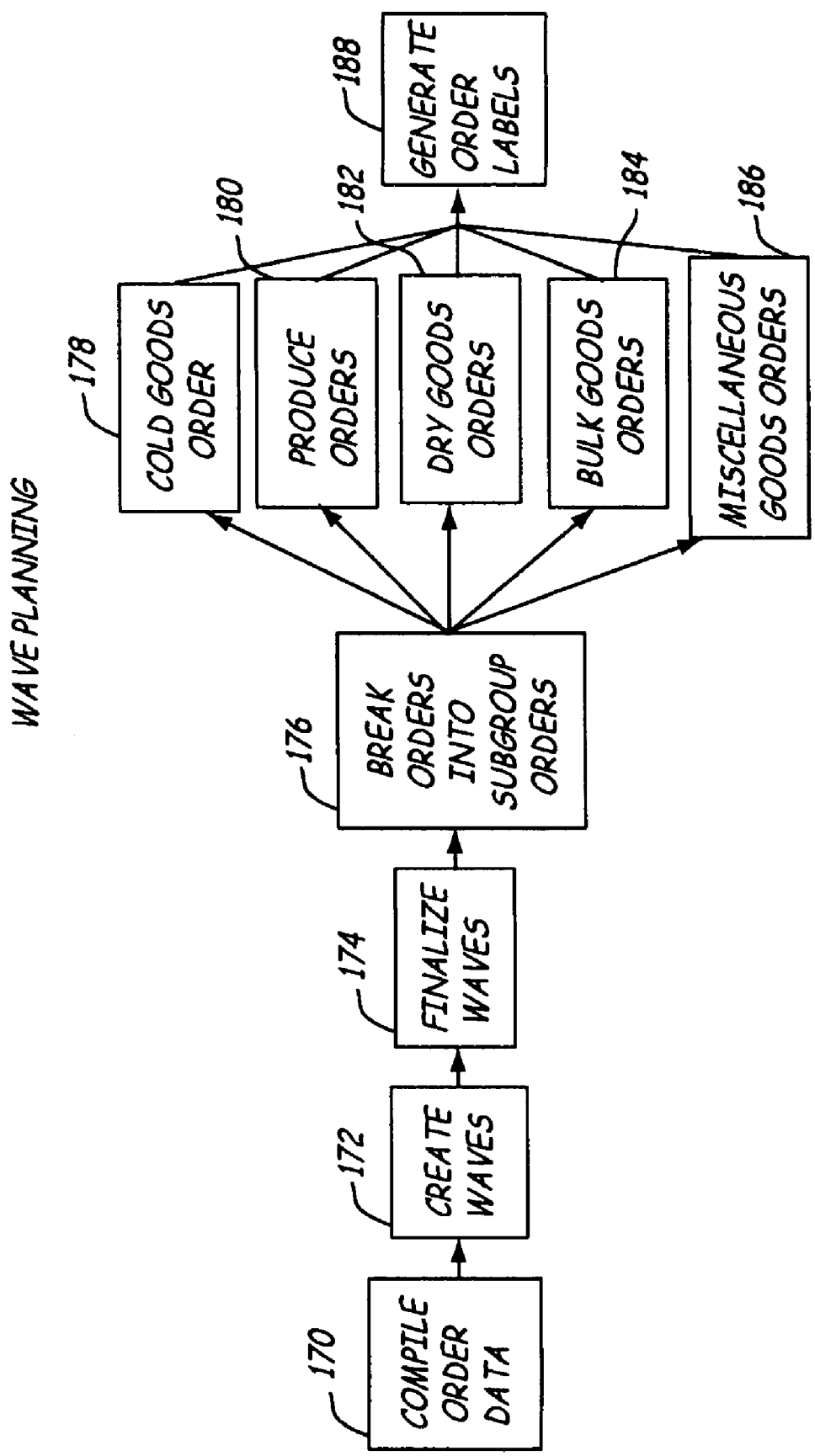
FIG. 20 is a flow diagram of a method of wave planning, according to one embodiment of the present invention.

FIG. 20 shows a method of wave planning 104 for order fulfillment 14 according to one embodiment of the present invention. After compiling the order data (block 170), waves are created (block 172) and finalized (block 174) based on requested delivery times and fulfillment capacity. After wave finalization, the orders are broken into subgroup orders (block 176). Subgroup orders are based on product subgroups, which are determined based on product type. In one aspect of the present invention relating to delivery of grocery products, subgroups include cold goods, produce, dry goods, bulk goods, and miscellaneous goods. The products are divided up into subgroups in the present invention because product fulfillment can be completed more economically and efficiently when the products are located in different areas based on subgroups during the fulfillment process. Cold goods include products requiring freezing or refrigeration. Dry goods are non-cold, non-produce goods such as bakery items, packaged goods, beverages, infant care products, and household goods. Bulk goods are generally larger quantities of sizes of dry goods (e.g., 24-packs of soda cans, bags of dog food, etc.). Alternatively, the present invention encompasses any deliverable products or services.

Based on the subgroups defined above, the requested products from all qualifying orders are broken into subgroup orders (block 176) that include cold goods orders (block 178), produce orders (block 180), dry goods orders (block 182), bulk goods orders (block 184), and miscellaneous goods orders (block 186). Once the subgroup orders are determined, order labels are generated (block 188). The system of the present invention uses the order labels to provide for efficient product retrieval and track product fulfillment.

Figure 21:
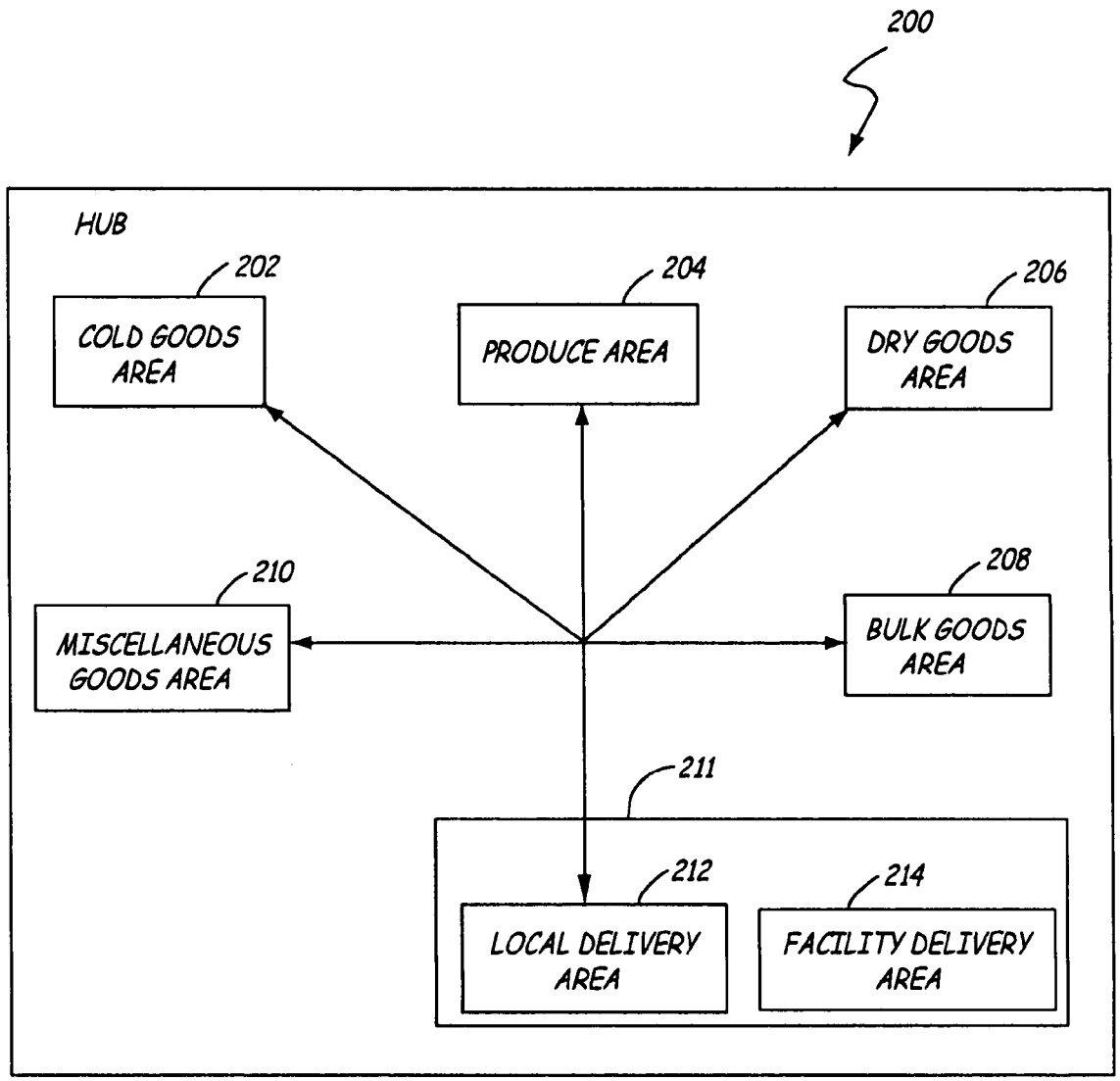
FIG. 21 is a schematic diagram of a fulfillment hub, according to one embodiment of the present invention.

The hub 200 of the delivery system of the present invention may serve as a fulfillment hub designed to allow for efficient product fulfillment. FIG. 21 depicts a fulfillment hub 200 according to one aspect of the present invention. A fulfillment hub 200, or warehouse facility, provides subgroup area organization that enhances the efficiency and economy of the system of the present invention. Each subgroup area is a separate area providing for separate product retrieval independent of product retrieval in each of the other subgroup areas. In one embodiment, the hub 200 includes a delivery area 211 from which all orders are subsequently delivered to the customer. The delivery area 211 includes a local delivery area 212 from which products are delivered to local customers, and a facility delivery area 214 from which products are transported to distribution facilities. The products are collected from one or more of several subgroup areas prior to transport to the delivery area 211. In one aspect of the present invention, the subgroup areas include the cold goods area 202, the produce area 204, the dry goods area 206, the bulk goods area 208, and the miscellaneous goods area 210. Totes are prepared in the tote preparation area (not shown) and transported from the prep area to the appropriate subgroup area. Alternative embodiments of the hub 200 may include additional subgroup areas depending on the products being marketed. For example, there may be a separate freezer goods area for freezer goods. The hub 200 provides a spatial organization conducive to generally parallel product retrieval as described below.

Figure 22:
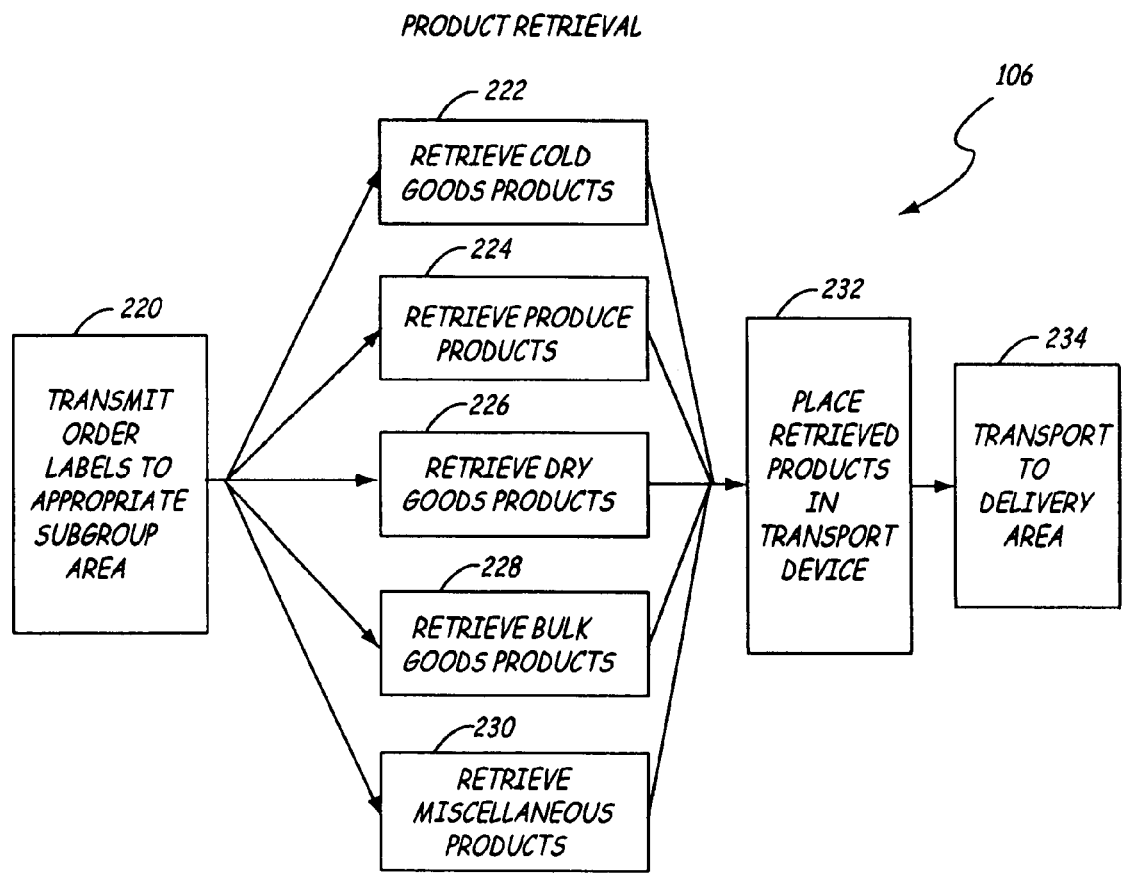
FIG. 22 is a flow diagram of a method of product retrieval, according to one embodiment of the present invention.

After an order has been received, analyzed, and routes and waves have been planned, the ordered products must be retrieved for an order fulfillment process. FIG. 22 shows an organized and efficient method of product retrieval 106 according to one embodiment of the present invention. Product retrieval 106 can be performed in a generally parallel fashion in a hub 200 similar to that depicted in FIG. 21. That is, products are retrieved from various subgroup areas during the same general time period or in a fashion such that retrieval of products at one subgroup area is independent of retrieval of products at other subgroup areas. This parallel retrieval promotes efficiency and speed. To perform product retrieval 106 in parallel, all order labels are first transmitted to appropriate subgroup areas (block 220). Alternatively, orders are divided into lists of subgroup products and sent to the designated subgroup areas for retrieval by any method allowing for separation by subgroup products and efficient transfer of that information to the appropriate areas. Parallel retrieval includes retrieving cold goods products (block 222), produce products (block 224), dry goods products (block 226), bulk goods products (block 228), and miscellaneous products (block 230) at generally the same time or in a fashion independent of each other. During retrieval, the retrieved products are placed in a transport device (block 232) and transported to the delivery area (block 234). In one aspect of the invention, the retrieved products are placed in a tote which is transported to the subgroup area from the tote preparation area (not shown). The retrieved products may also be placed in a cart. Alternatively, the retrieved products are placed in any known transport device capable of moving products in a warehouse setting.

We claim:

1. A method of delivery comprising: (a) establishing at least one delivery subsector adjacent to a distribution facility; (b) using a computing system having data processing logic and computer readable storage media with one or more computer programs stored thereon for planning two or more flexible delivery route areas in the at least one delivery subsector, each of the flexible delivery route areas defining a geographic area to which a delivery route is limited, wherein a geometric center of one of the flexible delivery route areas is furthest from the distribution facility and the geometric center of each successive flexible delivery route area is located closer to the distribution facility, and wherein one of the flexible delivery route areas is adjacent to the distribution facility, and wherein the planning of the two or more flexible delivery route areas comprises assigning delivery locations to delivery vehicles, wherein one or more delivery locations remain initially unassigned to a particular delivery vehicle, and wherein the one or more delivery locations initially unassigned are in the flexible delivery route area adjacent to the distribution facility and wherein the one or more delivery locations initially unassigned are closer to the distribution center than any initially assigned delivery locations; and (c) completing deliveries in the two or more flexible delivery route areas, wherein completing deliveries comprises delivering to at least some of the initially assigned delivery locations prior to delivering to the initially unassigned locations.

2. The method of claim 1 wherein planning the two or more flexible delivery route areas further comprises adjusting the two or more flexible delivery route areas based on a number of deliveries and an allotted time period.

3. The method of claim 2 wherein the allotted time period is four hours.

4. The method of claim 1 wherein the two or more flexible delivery route areas comprise three flexible delivery route areas.

5. The method of claim 1 wherein the at least one delivery subsector comprises at least two delivery subsectors, wherein the method further comprises completing all deliveries in one of the at least two delivery subsectors before making deliveries in any other of the at least two delivery subsectors.

6. The method of claim 1, wherein the at least one delivery subsector comprises at least two delivery subsectors, each of the at least two delivery subsectors being adjacent to another of the at least two delivery subsectors, and wherein each of the two or more flexible delivery route areas in each of the at least two delivery subsectors is adjacent to one of the two or more flexible delivery route areas in one of the adjacent delivery subsectors.

7. The method of claim 6 wherein the deliveries in one of the two or more flexible delivery route areas and the deliveries in the adjacent one of the two or more flexible delivery route areas in the adjacent delivery subsector are made by one delivery vehicle.

8. A method of delivery comprising: (a) establishing at least two delivery sectors adjacent to a distribution facility, each delivery sector having at least two delivery subsectors, each of the at least two delivery subsectors having at least two flexible delivery route areas, each flexible delivery route area defining a geographic area to which a delivery route is limited; (b) using a computing system having data processing logic and computer readable storage media with one or more computer programs stored thereon for planning a first route for one of the at least two flexible delivery route areas in each delivery subsector and then successively planning each additional route of the at least two flexible delivery route areas in each delivery subsector wherein each additional route is planned based on each previously planned route, wherein a geometric center of one of the flexible delivery route areas in each delivery subsector is located furthest from the distribution facility and the geometric center of each successive flexible delivery route area in each delivery subsector is located closer to the distribution facility, and wherein one of the flexible delivery route areas in each delivery subsector is adjacent to the distribution facility, and wherein the planning of the routes comprises assigning delivery locations to delivery vehicles, wherein one or more delivery locations remain initially unassigned to a particular delivery vehicle, and wherein the one or more delivery locations initially unassigned are in each of the flexible delivery route areas adjacent to the distribution facility and wherein the one or more delivery locations initially unassigned are closer to the distribution facility than any initially assigned delivery locations; and (c) completing deliveries in each of the at least two flexible delivery route areas in one of the at least two delivery subsectors concurrently, wherein completing deliveries comprises delivering to at least some of the initially assigned delivery locations in each of the at least two flexible delivery route areas prior to delivering to the initially unassigned locations.

9. The method of claim 8 wherein planning the first route and the additional routes is based in part on number of deliveries and allotted time period.

10. The method of claim 8 further comprising completing deliveries at each additional subsector of the at least two delivery subsectors, wherein delivery is completed in each subsector prior to beginning delivery in another subsector.

11. A method of delivery comprising: (a) distributing products from a distribution hub to a plurality of distribution facilities; (b) establishing at least two delivery sectors adjacent to each of the plurality of distribution facilities, wherein each delivery sector has at least two delivery subsectors, wherein each of the at least two delivery subsectors has at least two flexible delivery route areas, wherein each flexible delivery route area defines a geographic area to which a delivery route is limited; (c) using a computing system having data processing logic and computer readable storage media with one or more computer programs stored thereon for planning a first route of one of the at least two flexible delivery route areas in each delivery subsector and then successively planning each additional route of the at least two flexible delivery route areas in each delivery subsector, wherein each additional route in each delivery subsector is planned based on each previously planned route in each respective delivery subsector, wherein a geometric center of one of the flexible delivery route areas in each subsector is located furthest from the distribution facility and geometric centers of each successive flexible delivery route area in each respective delivery subsectors is located closer to the distribution facility, wherein one of the flexible delivery route areas in each delivery subsector is adjacent to the distribution center, and wherein planning the routes comprises assigning delivery locations to delivery vehicles, wherein one or more delivery locations remain initially unassigned to a particular delivery vehicle, wherein the one or more delivery locations initially unassigned are in each of the flexible delivery route areas adjacent to the distribution facility and wherein the one or more delivery locations initially unassigned are closer to the distribution facility than any initially assigned delivery locations; and (d) in each of the at least two delivery sectors, completing deliveries in each of the at least two flexible delivery route areas in one of the at least two delivery subsectors concurrently, wherein completing deliveries comprises delivering to at least some of the initially assigned delivery locations in each of the at least two flexible delivery route areas prior to delivering to the initially unassigned locations.

12. A method of ordering and delivering items comprising: (a) allowing customers to choose a recurring delivery slot from a selection of recurring delivery slots; (b) allowing the customers to order at least one desired item; (c) using a computing system having data processing logic and computer readable storage media with one or more computer programs stored thereon for planning two or more flexible delivery route areas in at least one delivery subsector, each of the flexible delivery route areas defining a geographic area to which a delivery route is limited, wherein a geometric center of one of the flexible delivery route areas in the at least one subsector is furthest from the distribution facility and geometric centers of each successive flexible delivery route area in the at least one delivery subsector are located closer to the distribution facility, wherein one of the flexible delivery route areas in the at least one delivery subsector is adjacent to the distribution facility, wherein the planning of the two or more flexible delivery route areas comprises assigning customer locations to delivery vehicles, wherein one or more of the customer locations remain initially unassigned to a particular delivery vehicle, and wherein the customer locations initially unassigned are in the flexible delivery route area adjacent to the distribution facility and wherein the customer locations initially unassigned are closer to the distribution center than any initially assigned customer locations; and (d) delivering from a distribution facility the at least one desired item to customer locations during the respective chosen recurring delivery slots of the customer, wherein delivering from the distribution facility comprises delivering to at least some of the initially assigned customer locations prior to delivering to the initially unassigned customer locations.

13. The method of claim 12 wherein allowing the customers to order at least one desired item further comprises allowing the customers to repeatedly order at least one desired item.

* * * * *